US005985067A

United States Patent [19]

Schmid et al.

[11] Patent Number: 5,985,067

[45] Date of Patent: Nov. 16, 1999

[54] FORMATION OF SPACERS SUITABLE FOR USE IN FLAT PANEL DISPLAYS

[75] Inventors: Anthony P. Schmid, Solana Beach; Christopher J. Spindt, Menlo Park; David L. Morris; Theodore S. Fahlen, both of San Jose; Yu Nan Sun, Sunnyvale, all of Calif.

[73] Assignee: Candescent Technologies Corporation, San Jose, Calif.

[21] Appl. No.: 08/962,088

[22] Filed: Oct. 31, 1997

Related U.S. Application Data

[62] Division of application No. 08/739,773, Oct. 30, 1996, Pat. No. 5,865,930, which is a division of application No. 08/414,408, Mar. 31, 1995, Pat. No. 5,675,212, which is a continuation-in-part of application No. 08/188,857, Jan. 31, 1994, abandoned, which is a continuation-in-part of application No. 08/012,542, Feb. 1, 1993, Pat. No. 5,589,731, which is a continuation-in-part of application No. 07/867, 044, Apr. 10, 1992, Pat. No. 5,424,605.

[51] Int. Cl.[6] .......................... B32B 31/26; B32B 31/18; H01J 19/44

[52] U.S. Cl. .................................... 156/89.16; 156/89.11; 156/89.28; 156/230; 156/248; 156/250; 156/265; 156/268; 156/300; 427/124; 427/126.2; 264/614; 264/681; 313/292; 313/422

[58] Field of Search ................................ 156/230, 89.11, 156/89.16, 89.28, 250, 268, 248, 65, 300; 427/124, 126.2, 126.3; 264/614, 616, 618, 619, 620, 674, 681; 313/422, 495, 292

[56] References Cited

U.S. PATENT DOCUMENTS

| | | |
|---|---|---|
| 2,274,592 | 6/1942 | Dearborn . |
| 2,475,864 | 7/1949 | Verwey et al. . |
| 3,291,706 | 12/1966 | Gebel . |

(List continued on next page.)

FOREIGN PATENT DOCUMENTS

| | | |
|---|---|---|
| 0 002 000 A1 | 5/1979 | European Pat. Off. . |
| 0 048 839 A1 | 4/1982 | European Pat. Off. . |
| 0 050 294 A1 | 4/1982 | European Pat. Off. . |

(List continued on next page.)

OTHER PUBLICATIONS

Andreadakis et al, "Influence of Barrier Ribs on the Memory Margin of ac Plasma Display Panels", *Proceedings of the SID*, vol. 31/4, 1990, pp. 355–360.

Binns, "Conducting Glazes: The Use of Valency–controlled Semi–conducting Oxides and the Development of Tin Oxide Glazes", *Brit. Cer. Soc., Trans & J.*, vol. 73, No. 1, 1974, pp. 7–17.

Brodie et al, "Vacuum Microelectronics", *Advances in Electronics and Electron Physics*, vol. 83, 1992, pp. 1–106.

(List continued on next page.)

*Primary Examiner*—Curtis Mayes
*Attorney, Agent, or Firm*—Skjerven, Morrill, MacPherson, Franklin & Friel LLP; Ronald J. Meetin

[57] ABSTRACT

The invention provides spacers for separating and supporting a faceplate structure and a backplate structure in a flat panel display, and methods for fabricating these spacers. Each spacer is typically made of ceramic, such as alumina, containing transition metal oxide, such as titania, chromia or iron oxide. Each spacer can be fabricated with an electrically insulating core and electrically resistive skins. The insulating core can be a wafer formed of ceramic such as alumina, and the resistive skins can be formed by laminating electrically resistive wafers, formed from alumina containing transition metal oxide, to the outside surfaces of the insulating core. Each spacer can also have a core of electrically insulating ceramic composition made of a ceramic containing a transition metal oxide in its higher oxide states, and electrically resistive outside surfaces made of a ceramic containing a transition metal oxide in lower oxide states. Face and/or edge metallization strips can optionally be provided on each spacer.

46 Claims, 12 Drawing Sheets

U.S. PATENT DOCUMENTS

| | | | |
|---|---|---|---|
| 3,755,704 | 8/1973 | Spindt et al. | 313/309 |
| 3,758,705 | 9/1973 | Schmid | 174/113 R |
| 3,808,497 | 4/1974 | Greeson, Jr. et al. | 313/182 |
| 3,823,252 | 7/1974 | Schmid | 174/68.5 |
| 3,922,420 | 11/1975 | Schnable et al. | 428/210 |
| 3,935,499 | 1/1976 | Oess | 313/413 |
| 4,021,219 | 5/1977 | Stockdale et al. | 65/43 |
| 4,030,903 | 6/1977 | Rittler | 65/32 |
| 4,088,920 | 5/1978 | Siekanowicz et al. | 313/422 |
| 4,099,082 | 7/1978 | Chodil et al. | 313/217 |
| 4,115,493 | 9/1978 | Sakabe et al. | 264/61 |
| 4,174,523 | 11/1979 | Marlowe et al. | 358/67 |
| 4,204,302 | 5/1980 | Bing et al. | 29/25.13 |
| 4,227,117 | 10/1980 | Watanabe et al. | 315/13 R |
| 4,312,770 | 1/1982 | Yu et al. | 427/126.2 X |
| 4,374,456 | 2/1983 | Takami et al. | 29/588 |
| 4,577,133 | 3/1986 | Wilson | 313/103 CM |
| 4,622,492 | 11/1986 | Barten | 313/422 |
| 4,698,285 | 10/1987 | Ehfeld et al. | 430/5 |
| 4,757,230 | 7/1988 | Washington et al. | 313/422 |
| 4,857,799 | 8/1989 | Spindt et al. | 313/495 |
| 4,887,000 | 12/1989 | Yamazaki et al. | 313/422 |
| 4,900,981 | 2/1990 | Yamazaki et al. | 313/422 |
| 4,923,412 | 5/1990 | Brodie et al. | 445/24 |
| 4,924,148 | 5/1990 | Schwartz | 315/169.4 |
| 4,963,225 | 10/1990 | Lehman-Lamer | 156/630 |
| 5,003,219 | 3/1991 | Muragishi et al. | 313/456 |
| 5,053,673 | 10/1991 | Tomii et al. | 313/308 |
| 5,061,341 | 10/1991 | Kildal et al. | 156/632 |
| 5,063,327 | 11/1991 | Brodie et al. | 313/482 |
| 5,083,058 | 1/1992 | Nonomura et al. | 313/482 |
| 5,099,388 | 3/1992 | Ogawa et al. | 361/321 |
| 5,130,614 | 7/1992 | Staelin | 315/366 |
| 5,130,830 | 7/1992 | Fukushima et al. | 359/72 |
| 5,155,410 | 10/1992 | Wakasano et al. | 313/402 |
| 5,160,871 | 11/1992 | Tomii et al. | 315/366 |
| 5,227,691 | 7/1993 | Murai et al. | 313/422 |
| 5,229,691 | 7/1993 | Shichao et al. | 315/366 |
| 5,313,136 | 5/1994 | Van Gorkom et al. | 313/422 |
| 5,448,131 | 9/1995 | Taylor et al. | 313/309 |
| 5,614,781 | 3/1997 | Spindt et al. | 313/422 |
| 5,717,287 | 2/1998 | Amrine et al. | 313/495 |
| 5,726,529 | 3/1998 | Dean et al. | 313/495 |
| 5,742,117 | 4/1998 | Spindt et al. | 313/422 |
| 5,746,635 | 5/1998 | Spindt et al. . | |
| 5,789,857 | 8/1998 | Yamaura et al. | 313/495 |

FOREIGN PATENT DOCUMENTS

| | | |
|---|---|---|
| 0 404 022 A2 | 12/1990 | European Pat. Off. . |
| 0 405 262 A1 | 1/1991 | European Pat. Off. . |
| 0 436 997A1 | 7/1991 | European Pat. Off. . |
| 0 464 938A1 | 1/1992 | European Pat. Off. . |
| 0 496 450A1 | 7/1992 | European Pat. Off. . |
| 0 523 702 A1 | 1/1993 | European Pat. Off. . |
| 0 580 244 A1 | 1/1994 | European Pat. Off. . |
| 0 690 476 | 1/1996 | European Pat. Off. . |
| 2 394 888 | 1/1979 | France . |
| 2 410 011 | 9/1974 | Germany . |
| 58202711 | 11/1983 | Japan . |
| 61-224256 | 10/1986 | Japan . |
| WO 94 18694 | 8/1994 | WIPO . |

OTHER PUBLICATIONS

Goede, "Digital Address Thin Display Tube", Northrop Corp./NTIS, Nov. 1974, pp. 1–134.

Goede, "A Digitally Addressed Flat–Panel CRT", *IEEE Transactions on Electron Devices*, vol. ED–20, No. 11, Nov. 1973, pp. 1052–1061.

Jaitly et al., "In–situ Insulator Surface Charge Measurements in Dielectric Bridged Vacuum Gaps Using an Electrostatic Probe", *IEEE Transactions on Electrical Insulation*, vol. 23, No. 2, Apr. 1988, pp. 261–273.

Meyer, "6"Diagonal Microtips Flourescent Display for T.V. Applications, *EuroDisplay Digest*, Sep. 1990, pp. 374–377.

Meyer "Recent Development on 'Microtips'Display at Leti", *Technical Digest of IVMC 91*, 1991, pp. 6–9.

Schmid, "Evidence for the Small Polaron as the Charge Carrier in Glasses Containing Transition Metal Oxides", *Journal of Applied Physics*, vol. 39, No. 7, Jun. 1968, pp. 3140–3149.

Schmid, "Small Polaron as the Source of the Frequency––Dependent Conductivity in Glasses Containing Transition Metal Oxides", *Journal of Applied Physics*, vol. 40, No. 10, Sep. 1969, pp. 4128–4136.

Schmid, "Studies of the A.C. Conductivity in Glass and Glass–Crystal Systems", *Journal of Non–Crystalline Solids*, vol. 4, 1970, pp. 232–233 presented at International Conference on Amorphous and Liquid Semiconductors, Sep. 24–27, 1969, 39 pages.

Takahashi et al, "Back Modulation Type Flat CRT", Japan Display '92, 1992, pp. 377–380.

Tannas, Jr., *Flat–Panel Displays and CRTs*, (Von Nostrand Reinhold) 1985, pp. 218–219, 231–232, 360, 400, 403.

Uchiike et al, "Reflective Phosphor Deposition on the Barrier Electrode Structure of an ac Plasma Display Results in High Brightness and High Luminous Efficiency", *SID 92 Digest*, Late–News Paper 28:6, 1992, pp. 543–546.

FORMATION OF SPACERS SUITABLE FOR USE IN FLAT PANEL DISPLAYS

CROSS-REFERENCE TO RELATED APPLICATIONS

This is a division of U.S. patent application Ser. No. 08/739,773, filed Oct. 30, 1996, now U.S. Pat. No. 5,865, 930, which is a division of U.S. patent application Ser. No. 08/414,408, filed Mar. 31, 1995, now U.S. Pat. No. 5,675, 212, which is a continuation-in-part of U.S. patent application Ser. No. 08/188,857, "Structure and Operation of High Voltage Supports," Spindt et al., filed Jan. 31, 1994, now abandoned, which is a continuation-in-part of U.S. patent application Ser. No. 08/012,542, "Internal Support Structure For Flat Panel Device," Fahlen et al., filed Feb. 1, 1993, now U.S. Pat. No. 5,589,731 which, in turn, is a continuation-in-part of U.S. patent application Ser. No. 07/867,044, "Self Supporting Flat Video Display," Lovoi, filed Apr. 10, 1992 now U.S. Pat. No. 5,424,605. To the extent not repeated herein, each of Ser. Nos. 08/188,857, 08/012,542, and 07/867,044 is hereby incorporated by reference. Ser. No. 08/188,857 has been continued as U.S. patent application Ser. No. 08/505,841, filed Jul. 20, 1995, now U.S. Pat. No. 5,614,781.

BACKGROUND OF THE INVENTION

1. Field of the Invention

This invention relates to flat panel devices such as a flat cathode ray tube (CRT) display. More particularly, this invention relates to a spacer structure for internally supporting a faceplate structure and a backplate structure of a flat panel device.

2. Related Art

Numerous attempts have been made in recent years to construct a flat CRT display (also known as a "flat panel display") to replace the conventional deflected-beam CRT display in order to provide a lighter and less bulky display. In addition to flat CRT displays, other flat panel displays, such as plasma displays, have also been developed.

In flat panel displays, a faceplate structure, a backplate structure, and connecting walls around the periphery of the faceplate and backplate structures form an enclosure. In some flat panel displays, the enclosure is held at vacuum pressure, e.g., typically $1\times10^{-7}$ torr or less. The faceplate structure includes an insulating faceplate and a light emitting structure formed on an interior surface of the insulating faceplate. The light emitting structure includes light emissive elements such as phosphor or phosphor patterns which define the active region of the display. The backplate structure includes an insulating backplate and electron-emitting elements located adjacent to the backplate. The electron-emitting elements are excited to release electrons which are accelerated toward the phosphor, causing the phosphor to emit light which is seen by a viewer at the exterior surface of the faceplate (the "viewing surface").

In vacuum pressure flat panel displays, a force is exerted on the faceplate and backplate structures of the flat panel display due to the differential pressure between the internal vacuum pressure and the external atmospheric pressure. If unopposed, this force can make the flat panel display collapse. The faceplate or backplate structure of a flat panel display may also fail due to external forces resulting from impacts sustained by the flat panel display.

Spacers have been used to internally support the faceplate and/or backplate structures. Previous spacers have been walls or posts located between pixels (phosphor regions that define the smallest individual picture element of the display) in the active region of the display.

Spacers have been formed by photopatterning polyimide. However, polyimide spacers may be inadequate because of: 1) insufficient strength; 2) inability to match the coefficient of thermal expansion of polyimide with the coefficient of thermal expansion of the materials typically used for the faceplate (e.g., glass), backplate (e.g., glass, ceramic, glass-ceramic or metal) and addressing grid (e.g., glass-ceramic or ceramic), resulting in breakage of the display; and 3) low required processing temperatures. With respect to item 3), the low processing temperature requirements prevent the use of higher process temperatures throughout the display assembly. The low temperature tolerance prevents the use of assembly methods and materials in the display that would otherwise be available. Examples of such methods and materials include: high reliability sealing frits, high temperature getter flash methods, and fast, high temperature vacuum bake outs (which reduce manufacturing costs).

Spacers have also been made of glass. However, glass may not have adequate strength. Further, micro-cracks that are inherent in glass make glass spacers even weaker than "ideal" glass because of the tendency of micro-cracks to propagate easily throughout the glass spacers.

European Patent Publication 580 244 A1 describes glass spacers provided with the following items: (1) a high-ohmic material ($10^9$–$10^{14}$ ohms/square) coated on a spacer edge adjacent to the backplate structure (2) a patterned low-ohmic layer coated on a spacer edge adjacent to the backplate structure, (3) a conducting layer coated on a spacer edge adjacent to the faceplate structure and (4) a coating having a low secondary emission coefficient formed over the entire spacer surface, including any layers provided by items (1), (2) and/or (3). The low secondary emission coefficient coatings of item (4) include polyimide, titanium dioxide ($TiO_2$), or a suspension including chromium oxide ($Cr_2O_3$) particles, glass particles and an organic binder such as isopropanol.

For any spacer material, the presence of spacers may adversely affect the flow of electrons toward the faceplate structure in the vicinity of the spacers. For example, stray electrons may electrostatically charge the surface of a spacer, changing the voltage distribution near the spacer from the desired distribution and resulting in distortion of the electron flow, thereby causing distortions in the image produced by the display.

It would therefore be desirable to have a spacer which is capable of adequately supporting and separating the faceplate and backplate structures while controlling the voltage distribution between these structures. It would also be desirable to have a spacer having a thermal coefficient of expansion which can be matched to the thermal coefficients of expansion of the faceplate and backplate structures. It would further be desirable to have a spacer which is easily manufacturable.

SUMMARY OF THE INVENTION

The invention provides structures and methods for forming high strength spacers for use in flat panel displays. These spacers are positioned between a faceplate structure and a backplate structure of a flat panel display.

In one embodiment, an electrically resistive spacer is formulated from a mixture of ceramic, such as aluminum oxide (alumina), which contains one or more transition metal oxides, such as titanium oxide (titania), chromium oxide (chromia), iron oxide or vanadium oxide. A wafer is fabricated from the ceramic composition and fired. The wafer is given a desired electrical resistivity by controlling the time, temperature and kiln atmosphere during the firing step and by controlling the ratios of the transition metals to the other components of the ceramic composition.

Face metallization strips are formed along one or more of the outside surfaces of the wafer. After the metallization has been formed, the wafer is cut parallel to the face metallization strips to create the spacers.

As a result, the face metallization strips are positioned on the spacers immediately adjacent to the spacer edges which contact the faceplate and backplate structures. When the spacers are positioned between the faceplate and backplate structures, the face metallization strips provide electrical contacts between the spacers and the faceplate and backplate structures. This advantageously provides an even voltage distribution near the spacer ends.

Additionally, edge metallization strips can be formed over the spacer edges which contact the faceplate and backplate structures. The edge metallization provides an electrical connection between the spacers and the faceplate and backplate structures.

In another embodiment of the present invention, a spacer has an electrically insulating ceramic core with electrically resistive skins connected to the opposing outside surfaces of the spacer. The insulating ceramic core can be alumina, and the resistive skins can be formed from ceramic, such as alumina, containing a transition metal oxide, such as chromia, titania, iron oxide and/or vanadium oxide.

In one variation, a spacer is fabricated by forming a wafer from an electrically insulating ceramic and forming at least one additional wafer from an electrically resistive ceramic composition which includes an insulating ceramic and a transition metal oxide. The ceramic composition wafer may be thinner than the insulating ceramic wafer. The ceramic composition wafer is laminated on the outside surface of the insulating ceramic wafer to form a laminated wafer having electrically resistive skins. The laminated wafer is fired. After firing at the desired temperature and atmosphere, the wafer exhibits the desired electrical resistivity. Face metallization strips are formed on the outside surfaces of the laminated wafer. The resulting structure is cut along the face metallization strips to form the spacers. Edge metallization strips can also be added.

The electrical resistivity of the ceramic composition at the outside surface(s) of the spacers allows stray electrons to flow through this ceramic composition when a voltage is applied across the spacers, thereby preventing charge build-up on the outside surfaces of the spacers. The formulation of the ceramic composition wafer can be chosen to have a low secondary electron emission to further reduce the charging effects. The strength of ceramic compositions, particularly those based on alumina is generally quite high, thereby reducing the number of spacers required in a display of a given size.

In another variation, a spacer is fabricated by forming an electrically resistive coating on an electrically insulating ceramic wafer. The insulating ceramic wafer is typically made of alumina, a filled glass or another ceramic composition. The electrically resistive coating can be insulating ceramic containing a transition metal oxide. The insulating ceramic wafer can be fired either before or after the electrically resistive coating is applied. Face metallization strips are fabricated on the outside surfaces of the resulting wafer structure. The resulting wafer structure is cut parallel to the face metallization strips to create the spacers. Edge metallization can also be added.

The electrical resistivity of the resistive coating at the outside surface(s) of the spacers allows stray electrons to flow through this resistive coating when a voltage is applied across the spacers, thereby preventing charge build-up on the outside surfaces of the spacers. A further advantage of the coating technique is that strength required of the spacer is provided by the ceramic core. This allows a broader selection of coating materials which may be selected to provide the desired combination of secondary electron emission and electrical resistivity to control the charging behavior of the spacer.

In yet another variation, the electrically insulating ceramic core of the spacer is formed from a ceramic composition, such as alumina containing a transition metal oxide, wherein the transition metal oxide is present in the higher oxide states (i.e., a maximal valence oxide). Electrically resistive skins are formed at the outside surfaces of the spacer by chemically reducing the outside surfaces of the spacer. By reducing the outside surfaces of the spacer, the coordination of the transition metal ions at these outside surfaces is altered, thereby causing the transition metal oxide to become electrically resistive at the outside surfaces of the spacer. The spacer core remains electrically insulating. Face metallization strips are formed on the outside surfaces of the wafer, and a firing step is performed in a neutral atmosphere on the resulting structure. The wafer is then cut parallel to the face metallization strips to form spacers. Edge metallization may be added.

The spacers described above, when used in a flat panel display, advantageously reduce power consumed by the spacers while preventing charge build-up at the outside surfaces of the spacers. The thermal coefficients of expansion of the spacers can be controlled to achieve desired values by controlling the percentages of the materials used in the spacers. In general, the wafer can be fired before or after the metallization is formed, depending upon the particular method used. The methods described above provide relatively simple and inexpensive techniques for the fabrication of the spacers.

Figure 6:
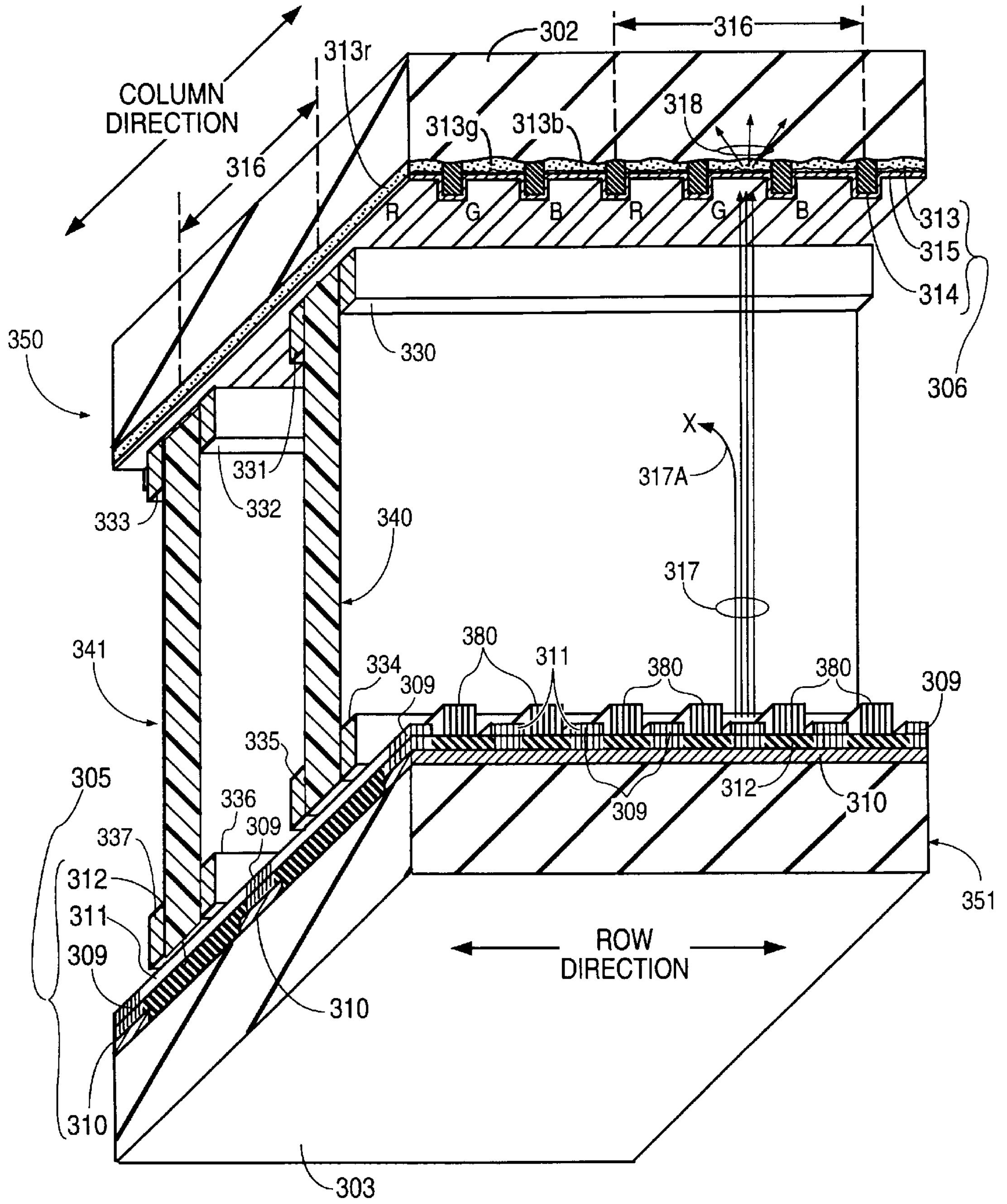
Figure 7:
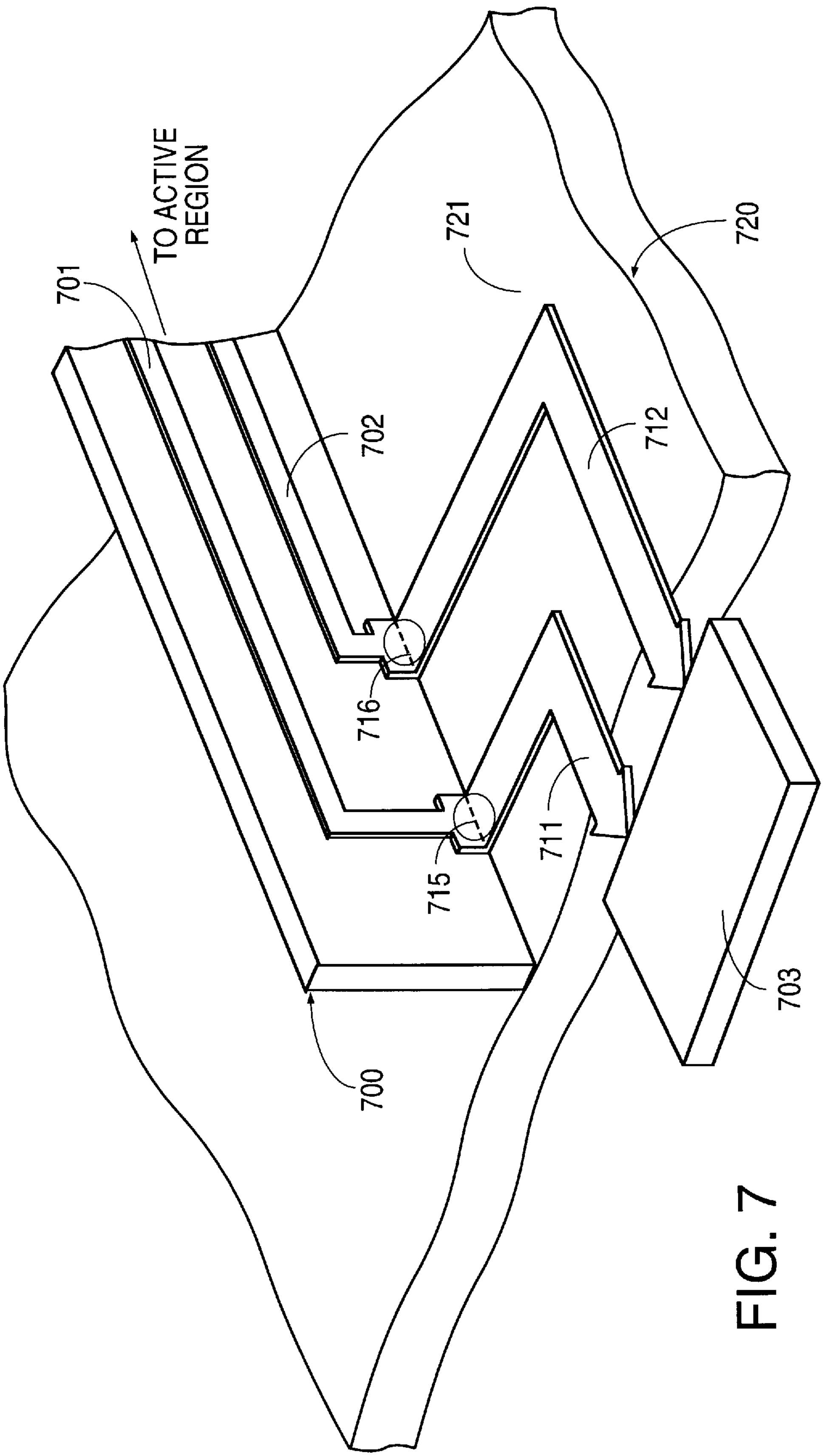
Figure 8:
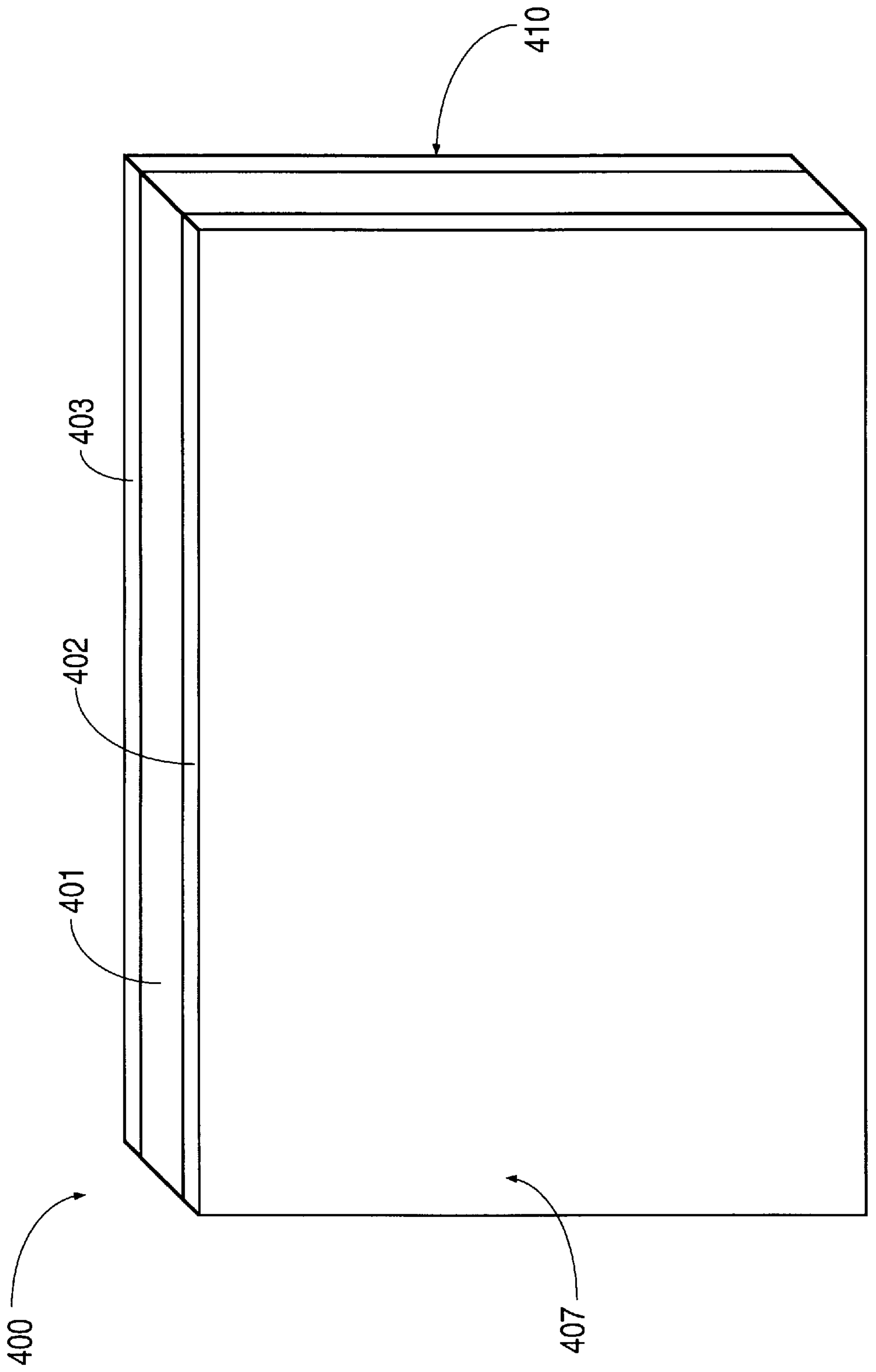
Figure 9:
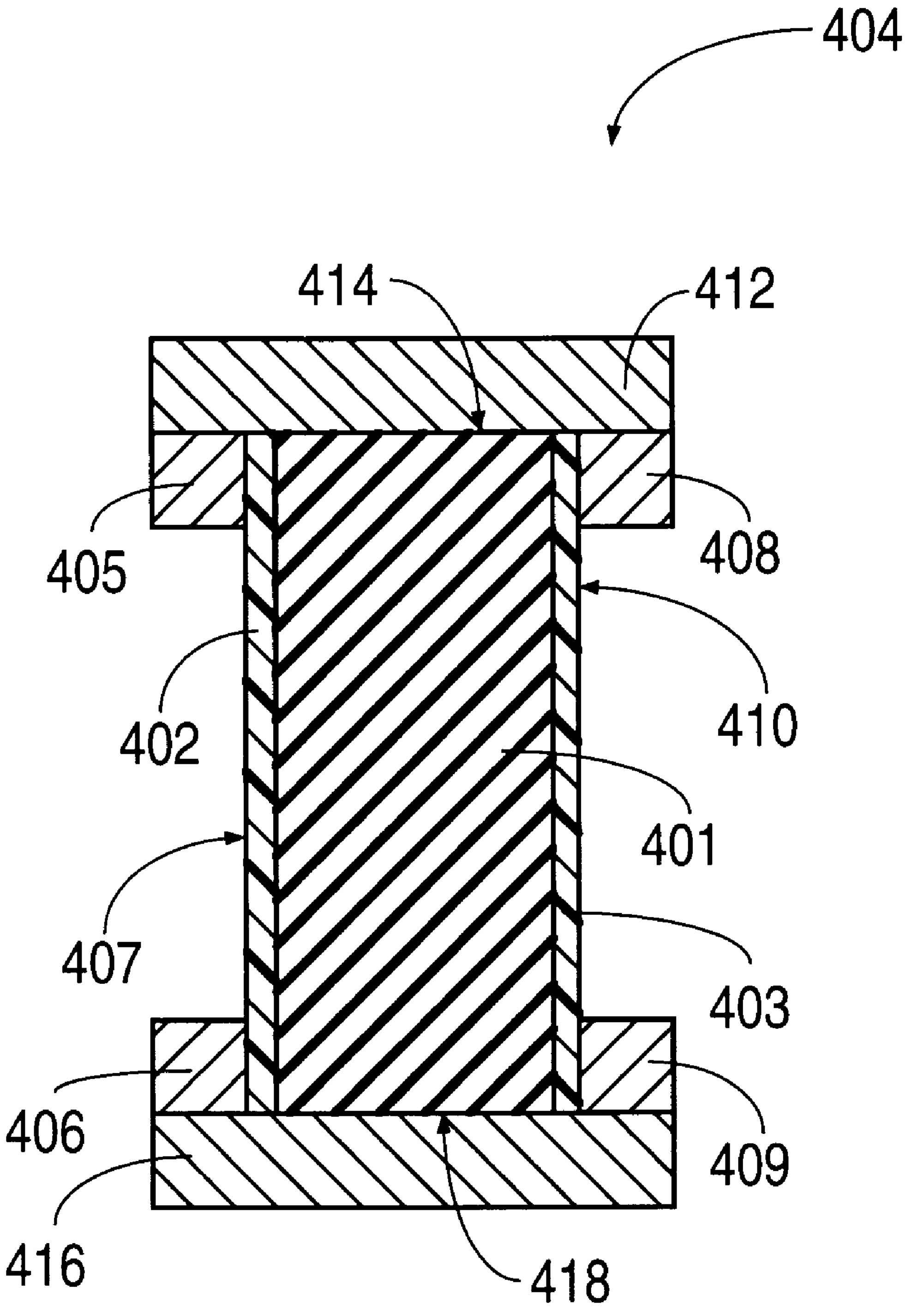
Figure 10:
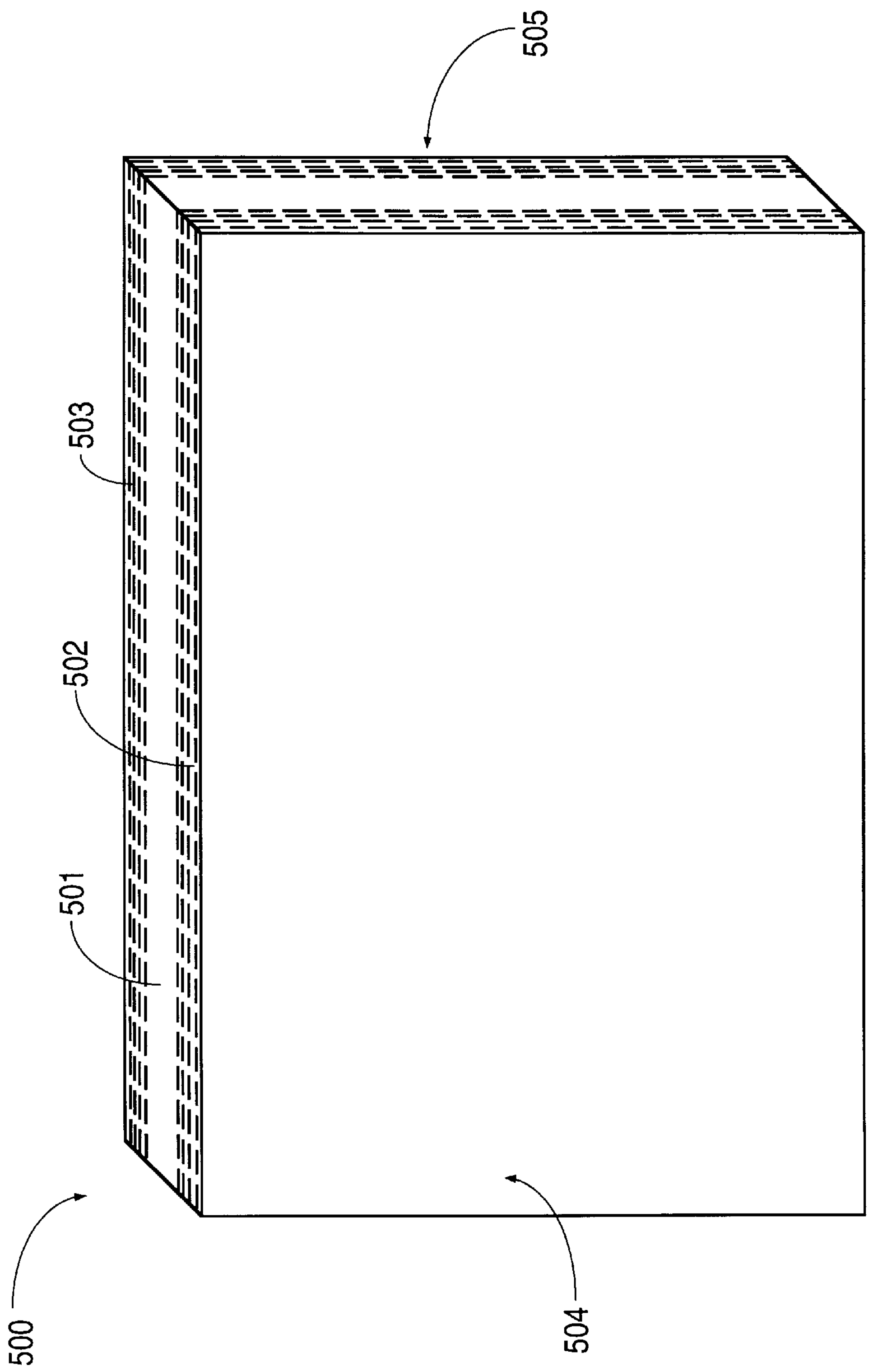
Figure 11:
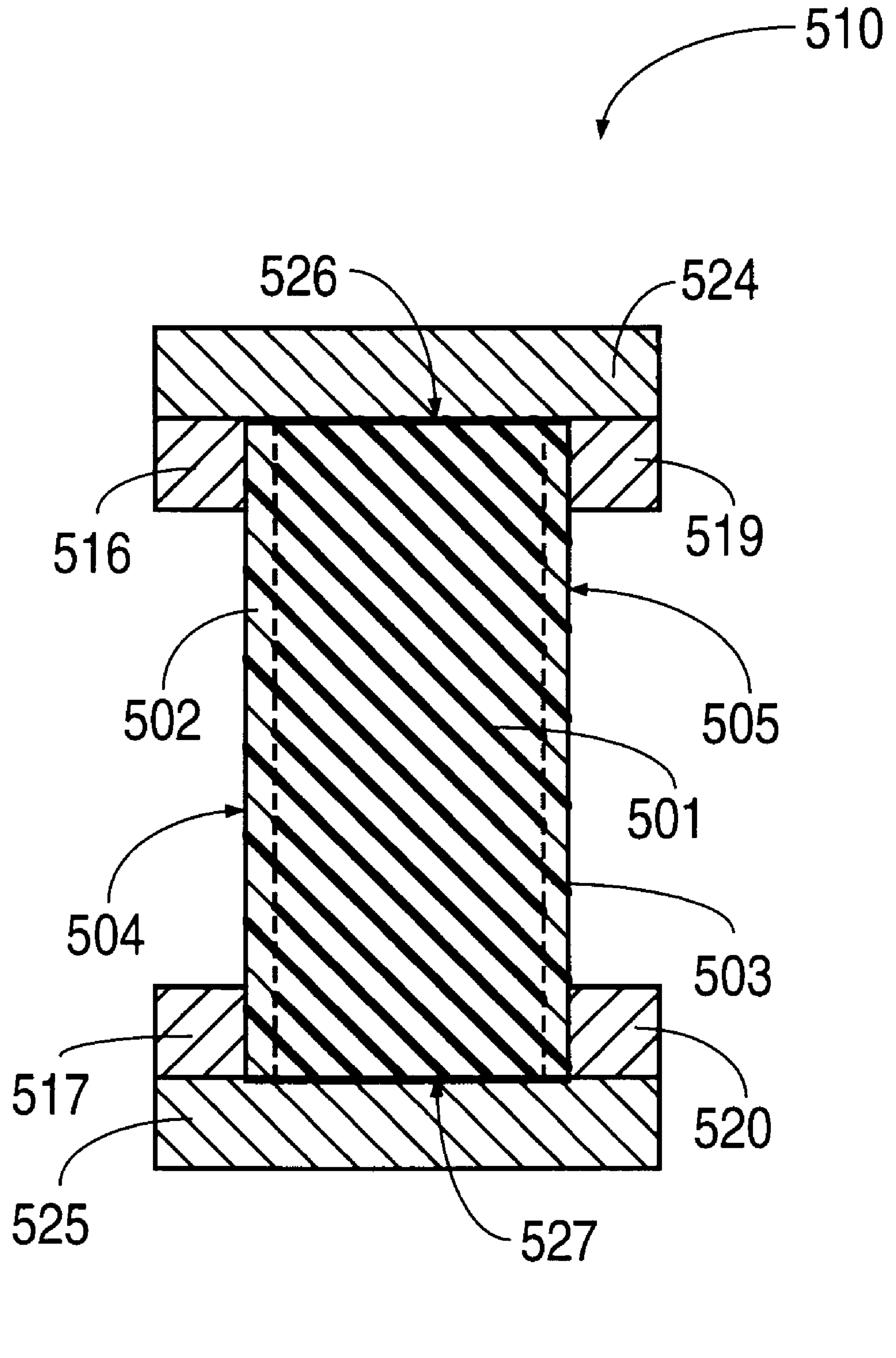
Figure 12:
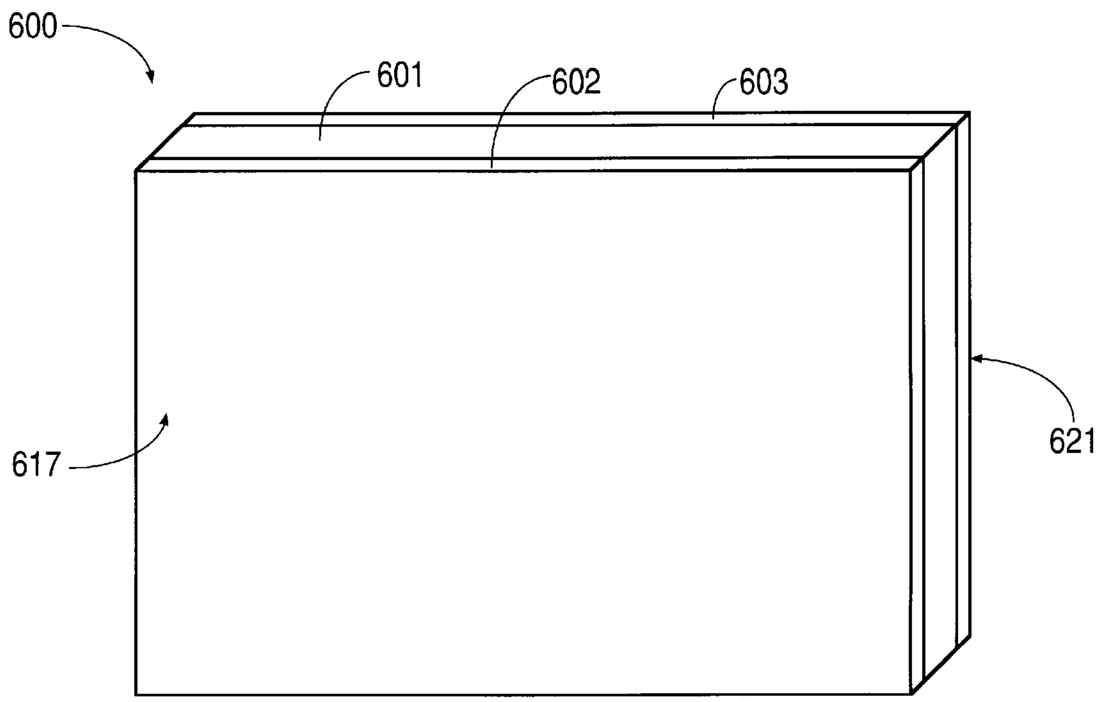
Figure 13:
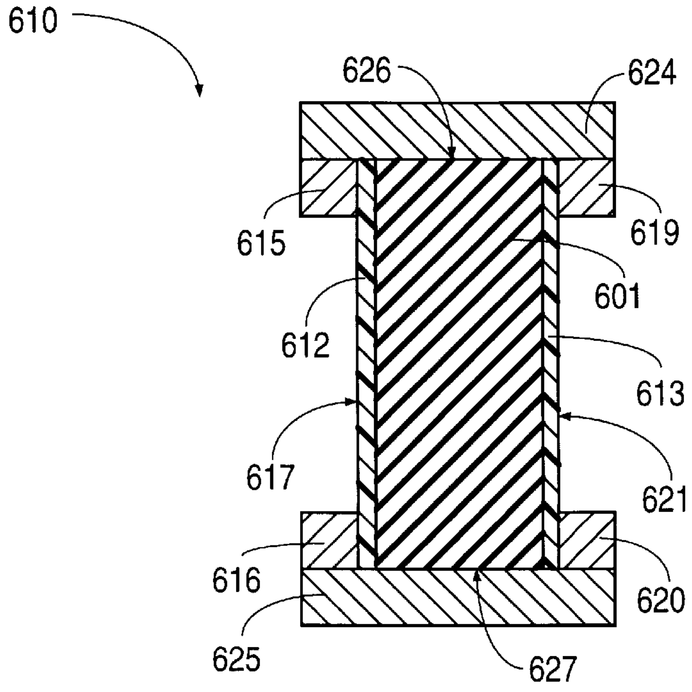

FIGS. **5*a*–5*d*** are cross sectional views illustrating a method of forming a spacer in accordance with one embodiment of the invention;

FIG. 6 is a perspective view of spacers positioned between a faceplate structure and a backplate structure;

FIG. 7 is a perspective view illustrating the connection of potential adjustment electrodes of a spacer to a power supply;

FIG. 8 is a perspective view of a laminated wafer having an electrically insulating core and electrically resistive skins;

FIG. 9 is a cross sectional view of a spacer formed from the laminated wafer of FIG. 8;

FIG. 10 is a perspective view of another wafer having an electrically insulating core and electrically resistive skins;

FIG. 11 is a cross sectional view of a spacer formed from the wafer of FIG. 10;

FIG. 12 is a perspective view of yet another wafer having an electrically insulating core and electrically resistive skins; and FIG. 13 is a cross sectional view of a spacer formed from the wafer of FIG. 12.

In general, electrically conductive regions are illustrated with thin angled lines, electrically resistive regions are illustrated with alternating thick and thin angled lines, and electrically insulating regions are illustrated with thick angled lines.

DETAILED DESCRIPTION OF EMBODIMENTS OF THE INVENTION

The following definitions are used in the description below. Herein, the term "electrically insulating" (or "dielectric") generally applies to materials having a resistivity greater than $10^{12}$ ohm-cm. The term "electrically non-insulating" thus refers to materials having a resistivity below $10^{12}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{12}$ ohm-cm. These categories are determined at low electric fields.

Examples of electrically conductive materials (or electrical conductors) are metals, metal-semiconductor compounds, and metal-semiconductor eutectics. Electrically conductive materials also include semiconductors doped (n-type or p-type) to a moderate or high level. Electrically resistive materials include intrinsic and lightly doped (n-type or p-type) semiconductors. Further examples of electrically resistive materials are cermet (ceramic with embedded metal particles) and other such metal-insulator composites. Electrically resistive materials also include conductive ceramics and filled glasses.

Spacers of the invention can be utilized to separate the faceplate and backplate structures in a flat cathode ray tube (CRT) display. A faceplate structure typically includes an electrically insulating faceplate with a light emitting structure located on an interior surface of the faceplate. The backplate structure typically includes an electrically insulating backplate with an electron emitting structure located on an interior surface of the backplate.

Spacers in accordance with the invention can also be used in other flat panel displays such as plasma displays or vacuum fluorescent displays. Further, these spacers are not limited to use in displays, but can be used in other flat panel devices used for purposes such as optical signal processing, optical addressing in devices such as phased array radar devices, or in devices, such as copiers or printers, which scan an image to be reproduced on another medium. Additionally, the invention is applicable to flat panel devices having non-rectangular screen shapes, e.g., circular, and irregular screen shapes such as might be used in a vehicle dashboard or an aircraft control panel.

Herein, a flat panel display is a display in which the faceplate and backplate structures are substantially parallel, and the thickness of the display is small compared to the thickness of a conventional deflected-beam CRT display, the thickness of the display being measured in a direction substantially perpendicular to the faceplate and backplate structures. Typically, though not necessarily, the thickness of a flat panel display is less than 5 cm. Often, the thickness of a flat panel display is substantially less than 5 cm—e.g., 0.5–2.5 cm.

Spacers of the invention can be used in flat panel displays such as those described in more detail in parent U.S. patent application Ser. No. 08/188,857, cited above; commonly owned, co-pending U.S. patent application Ser. No. 08/188,856 "Structure and Fabrication of Device with Raised Black Matrix for Use in Optical Displays Such as Flat-Panel Cathode-Ray Tubes," Curtin et al., filed Jan. 31, 1994, now U.S. Pat. No. 5,477,105; commonly owned, co-pending U.S. patent application Ser. No. 08/188,855, "Field Emitter with Focusing Ridges Situated to Sides of Gate," Spindt et al., filed Jan. 31, 1994, now U.S. Pat. No. 5,528,103; commonly owned, co-pending U.S. patent application Ser. No. 08/118,490, "Structure and Fabrication of Filamentary Field-Emission Device, Including Self-Aligned Gate" Macaulay et al., filed Sep. 8, 1993, now U.S. Pat. No. 5,462,467 and commonly owned, co-pending U.S. patent application Ser. No. 08/158,102, "Field-Emitter Fabrication Using Charged-Particle Tracks, and Associated Field-Emission Devices", Spindt et al., filed Nov. 24, 1993, now U.S. Pat. No. 5,559,389; the pertinent disclosures of which are incorporated by reference herein.

There are several methods of producing spacers in accordance with the invention. These methods include (1) manufacturing a spacer from a solid piece of uniform electrically resistive material such as a ceramic containing a transition metal oxide or a filled glass system in which the glass is made electrically resistive by the addition of a transition metal oxide and the fillers are chosen to provide the desired electron emission and thermal expansion match, (2) manufacturing a spacer by laminating electrically resistive skins on outside surfaces of an electrically insulating core, (3) manufacturing a spacer from an electrically insulating ceramic composition, wherein electrically resistive skins are formed at the outside surfaces of the spacer by reducing the outside surfaces of the ceramic composition, and (4) manufacturing a spacer by coating an electrically resistive material on an electrically insulating core.

In Method (1) listed above, spacers are formed from a solid piece of uniform electrically resistive material. In one embodiment, the uniform resistive material is an electrically resistive ceramic composition formed by combining a transition metal oxide such as iron oxide, titania, chromia, vanadium oxide or nickel oxide with an electrically insulating ceramic such as alumina. The combination of a transition metal oxide and the alumina results in a ceramic which has an electrical resistivity in the desired range of $10^5$ to $10^{10}$ ohm-cm.

When adding titanium or iron to alumina, the replacement of as few as 4% of the aluminum cations in the alumina results in a resistivity in the desired range (i.e., $10^5$ to $10^{10}$ ohm-cm). Because of the small amount of titanium or iron required, the thermal coefficient of expansion (TCE) of the resulting composition is essentially the same as the TCE of alumina.

A larger amount of chromia is combined with alumina to provide an electrical resistivity in the desired range. As a higher percentage of chromia is added to the ceramic composition, the effective inter-cation distance in the resulting lattice structure decreases. This decreased inter-cation distance increases the overlap of electrons in the lattice structure, thereby forming a composition having the desired electrical resistivity. A ceramic including alumina and chromia can contain up to 90% chromia by weight.

The use of chromia advantageously results in a ceramic having a low secondary electron emission. For example, a ceramic composition of alumina and chromia can have a secondary electron emission of less than two at 2 kV. This advantageously reduces the voltage deviation around the spacers.

By controlling the relative amounts of chromia and alumina, the TCE of the resulting ceramic composition can be controlled to be any value between the TCE of alumina (approximately 72) and the TCE of chromia (approximately 84). In certain embodiments, silicon dioxide (silica) is added to the alumina and chromia to keep the TCE near 70. Alumina and chromium sesquioxide (Eskolaite) are known to form a continuous range of solid solutions all having the corundum crystal structure. X-ray diffraction studies have shown that the crystal structure can be maintained as corundum even while accommodating up to 20% admixtures of silica. Other transition metal oxides, such as oxides of iron or vanadium, can be used to create the electrically resistive ceramic composition.

In Method (1), spacers are fabricated from a slurry created by mixing ceramic powders, organic binders and a solvent in a conventional ball mill. In a particular embodiment, this slurry is a ceramic composition which includes 90% alumina and 10% titania (hereafter, the "90/10 alumina-titania composition"). Table 1 sets forth a formula for such a slurry.

TABLE 1

| | | |
|---|---|---|
| Alumina powder | 292 | grams |
| Titania powder | 32 | grams |
| Butvar B76 | 34 | grams |
| Santicizer 150 | 10 | grams |
| Kellox Z3 Menahden oil | 0.65 | gram |
| Ethanol | 105 | grams |
| Toluene | 127 | grams |

In another embodiment, the slurry is a ceramic composition which includes 2% titanium, 34.3% alumina and 63.7% chromia (hereafter, the "2/34/64 composition"). Table 2 sets forth a formula for such a slurry.

TABLE 2

| | | |
|---|---|---|
| Alumina powder | 111.1 | grams |
| Chromia powder | 206.4 | grams |
| Titania powder | 6.48 | grams |
| Butvar B76 | 34 | grams |
| Santicizer 150 | 10 | grams |
| Kellox Z3 Menahden oil | 0.65 | gram |
| Ethanol | 105 | grams |
| Toluene | 127 | grams |

In other embodiments, the ceramic formula also contains modifiers chosen to control grain size or aid sintering. Compounds such as silicon dioxide, magnesium oxide, and calcium oxide can be used as modifiers.

Using conventional methods, the milled slurry is used to cast a tape having a thickness of 110–120 $\mu$m. In one embodiment, this tape is cut into large wafers which are 10 cm wide by 15 cm long. The wafers are then loaded onto a flat conventional setter and fired in air and/or a reducing atmosphere until the wafers exhibit the desired resistivity.

In particular, the wafers are typically fired in a cold wall periodic kiln using a hydrogen atmosphere with a typical dew point of 24° C. If the organic components of the wafer are to be pyrolized (i.e., removed) in the same kiln, the dew point of the hydrogen atmosphere will be higher (approximately 50° C.) to facilitate removal of the organics without damaging the wafers. The dewpoint will be shifted from the higher dew point (50° C.) to the lower dewpoint (24° C.) after the organic components of the wafer are pyrolized. Pyrolysis is typically complete at a temperature of 600° C. Typically, the wafers are fired at a peak temperature of 1620° C. for 2.5 hours. The properties of the ceramic composition are controlled by the detailed firing profile. Depending on the starting raw materials, and on the exact combination of strength, stability, resistivity, and secondary electron emission desired in the spacer, the actual peak temperature may be between 1450° C. and 1750° C., and the firing profile may maintain this peak temperature from 1 to 16 hours.

The wafers are then unloaded and inspected. For the 90/10 alumina-titania composition, the measured TCE of the resulting wafers was 71.6. The resulting wafers had a resistivity of approximately $10^8$ ohm-cm. The 2/34/64 composition results in a resistivity of approximately $2\times10^8$ ohm-cm.

Next, stripes (or strips) of metal are formed on at least one face of the wafer. These face metal stripes will serve as electrodes on the face of the resulting spacer. Face metal stripes may be put down by any of a number of suitable techniques such as evaporation, sputtering photolithography, electroplating, screen printing, direct-pen writing, or by decomposition of an organometallic material with a laser beam.

If, for example, the face metal stripes are fabricated by evaporation, the following steps would be appropriate. The wafer is first masked so that the evaporated metal will fall only on the desired portions of the face of the wafer. The masked wafer is placed in a vacuum chamber (not shown). The vacuum chamber contains an arrangement of containers which may be heated so that a metal (e.g., chromium, nickel or aluminum) placed within the containers is vaporized at low pressure. The mean free path of the metal atoms in the vapor under such conditions is long enough that the metal atoms impinge on the exposed surface of the substrate with considerable force, thereby promoting adhesion of the metal atoms with the exposed face of the wafer. Thus, a metal stripe is formed on the surface of the wafer wherever there is an opening in the mask. The evaporation conditions depend upon the metal chosen to form the stripes and the condition of the wafer surface. The evaporation temperature is typically in the vicinity of 1000° C., and the time to effect the evaporation is less than a minute. The vacuum evaporation apparatus typically has a port and other means by which the parts may be rapidly introduced into the chamber and the supply of metal replenished.

The mask can be made by standard photolithographic techniques. Such techniques allow fine metal stripes to be fabricated, especially during the fabrication of non planar spacer structures. In photolithographic techniques, the wafer is first coated with a commercial photoresist and the photoresist is cured. The cured resist is exposed by projection of the desired stripe pattern onto the surface. The surface of the wafer is exposed by washing away the unexposed photoresist. The wafer thus prepared is placed into the vacuum evaporator. Metal is evaporated onto the wafer surface in the manner previously described. The metallized wafer is removed from the chamber and the photoresist is chemically removed. During the photoresist removal, the metal lying on the photoresist is lifted off so that the metal electrode stripes are left on the face of the wafer.

Figure 1:
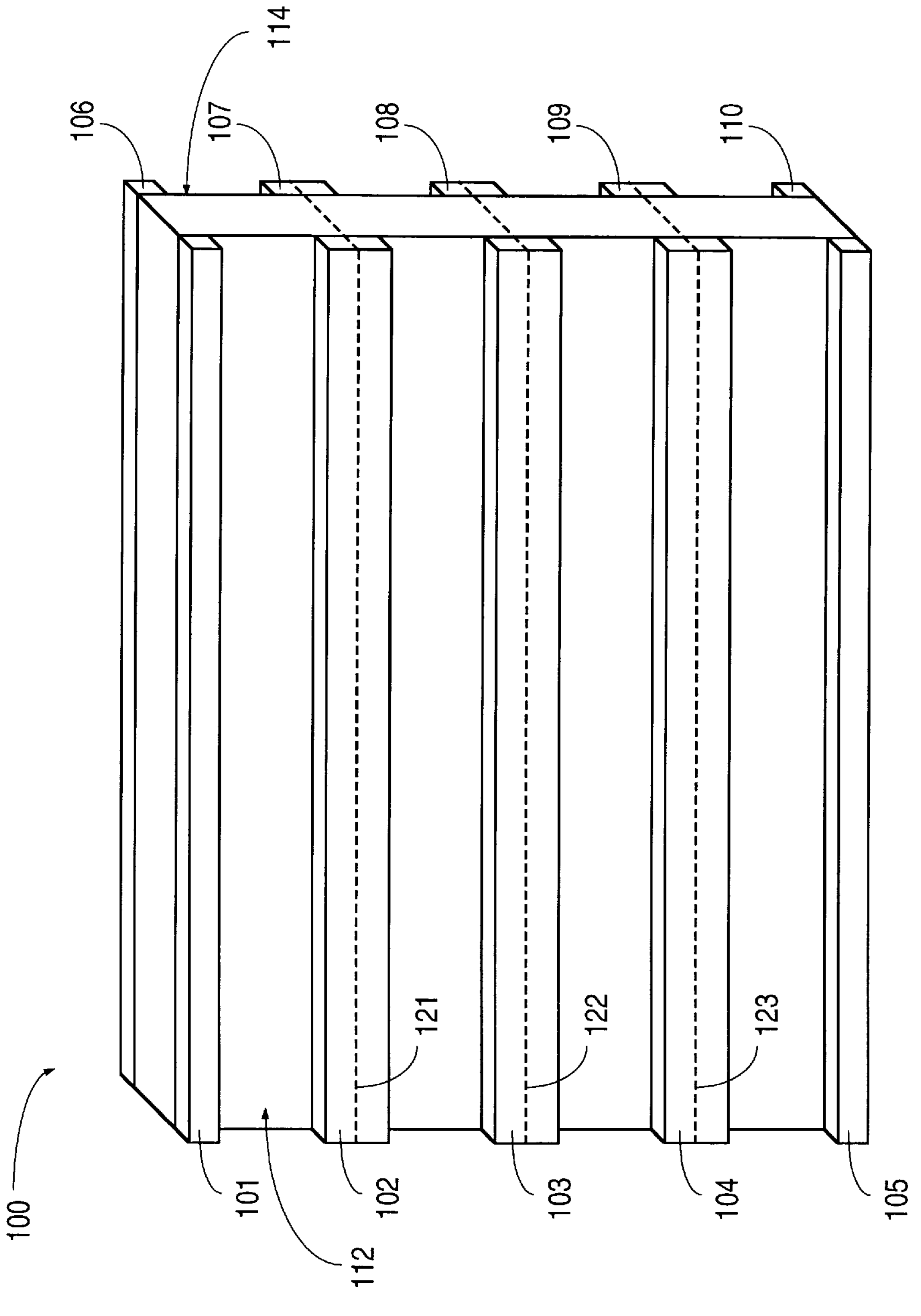
FIG. 1 is a perspective view of a wafer used to form spacers in accordance with the invention.

FIG. 1 illustrates a wafer 100 having face metallization strips 101–105 located on outside surface 112 and face metallization strips 106–110 formed on outside surface 114. Wafer 100 is greatly magnified for purposes of illustration. In one embodiment, there are 1140 face metallization strips, each having a width of 0.0025 mm. The face metallization strips on surface 112 are aligned with the face metallization strips on surface 114. For example, strip 103 is situated substantially opposite strip 108. The center-to-center spacing between each of these face metallization strips is typically 0.5 mm. As discussed below, this center-to-center spacing defines the spacer height.

The face metal stripes may also be applied by using materials similar to the thick film metallizations widely used to prepare hybrid circuits. These metallization materials consist of a mixture of a metal powder and powdered glass or other material that promotes adhesion of the metal to the ceramic. The metallization materials are suspended in an organic binder that allows the combination to be deposited by any of a variety of common printing techniques. Stripes of this material may be applied through masks similar to those used for evaporation, by screen printing or by direct application of the stripes using a special pen. In all cases, the material must be fired to fuse the metal powder into a conductor and simultaneously bond the material to the ceramic. The oxidation state of the ceramic materials employed in the wafer is crucial in determining the resistivity and charging behavior of the spacer. Maintaining this material in the proper oxidation state may require that the firing of the electrode metallization be carried out in a neutral or reducing atmosphere. Typically, thick film metallization materials are designed to fire at temperatures between 800° C. and 1000° C. While not all thick film metallizations are compatible with firing in atmospheres other than air, almost all manufacturers of these materials offer products specifically compounded for such firing.

Wafer 100 is subsequently cut along face metallization strips 101–110 to form spacers. Lines 121–123 indicate the locations of the cuts. This cutting step can be performed using a conventional saw having a diamond impregnated blade.

Figure 2:
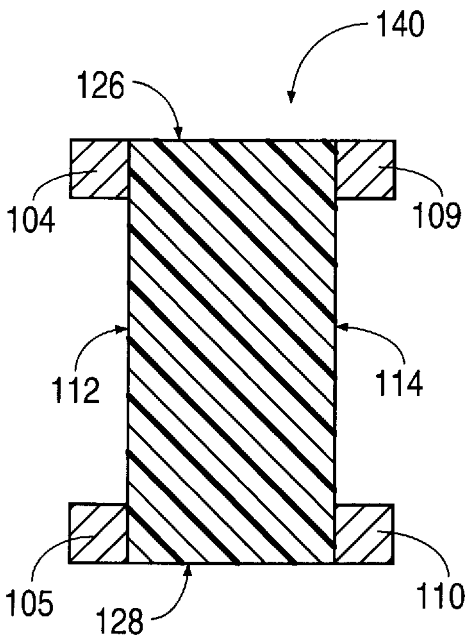
FIGS. 2–4 are cross sectional views of a spacer formed from the wafer of FIG. 1.

FIG. 2 illustrates a typical spacer 140 corresponding to the lowermost strip created after cutting along line 123 of wafer 100 (FIG. 1). Spacer 140 has outside surfaces 112 and 114 and edge surfaces 126 and 128.

Figure 3:
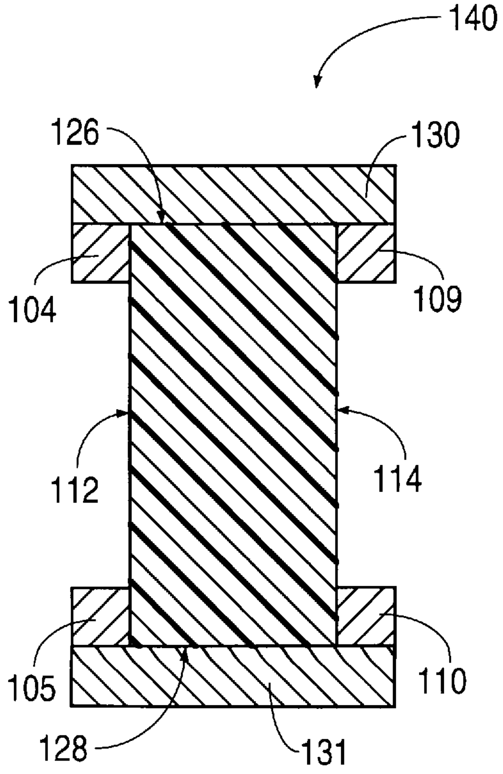

Edge metallization strips can be applied to the edge surfaces of each spacer. FIG. 3 depicts spacer 140 after edge metallization strips 130 and 131 are applied to edge surfaces 126 and 128. Edge metallization strips 130 and 131 are applied using conventional techniques.

Methods similar to those used for application of metal to the face of the wafer can be used to apply edge metallization strips 130 and 131. While there are differences in the fixturing required to orient the spacers so as to confine the metal to the edges, the process of applying the metallization material is only slightly altered. As a practical matter, in applying metal to the edges it is usual to gather the cut spacers into large blocks so that many may be processed at one time. Edge metallization has been placed on spacers by evaporating aluminum on the spacer edges and by screen printing silver, tungsten, or molybdenum-manganese on the spacer edges. Edge metallization has also been placed on spacers by combining silver or palladium with an organo-metallic material, screen coating the combination on the spacer edges, and thermally decomposing the combination at temperatures near 450° C.

After edge metallization strips 130 and 131 are formed, the resulting spacer structure can be fired in accordance with conventional techniques. Final inspection is performed to complete the fabrication of spacer 140.

Figure 4:
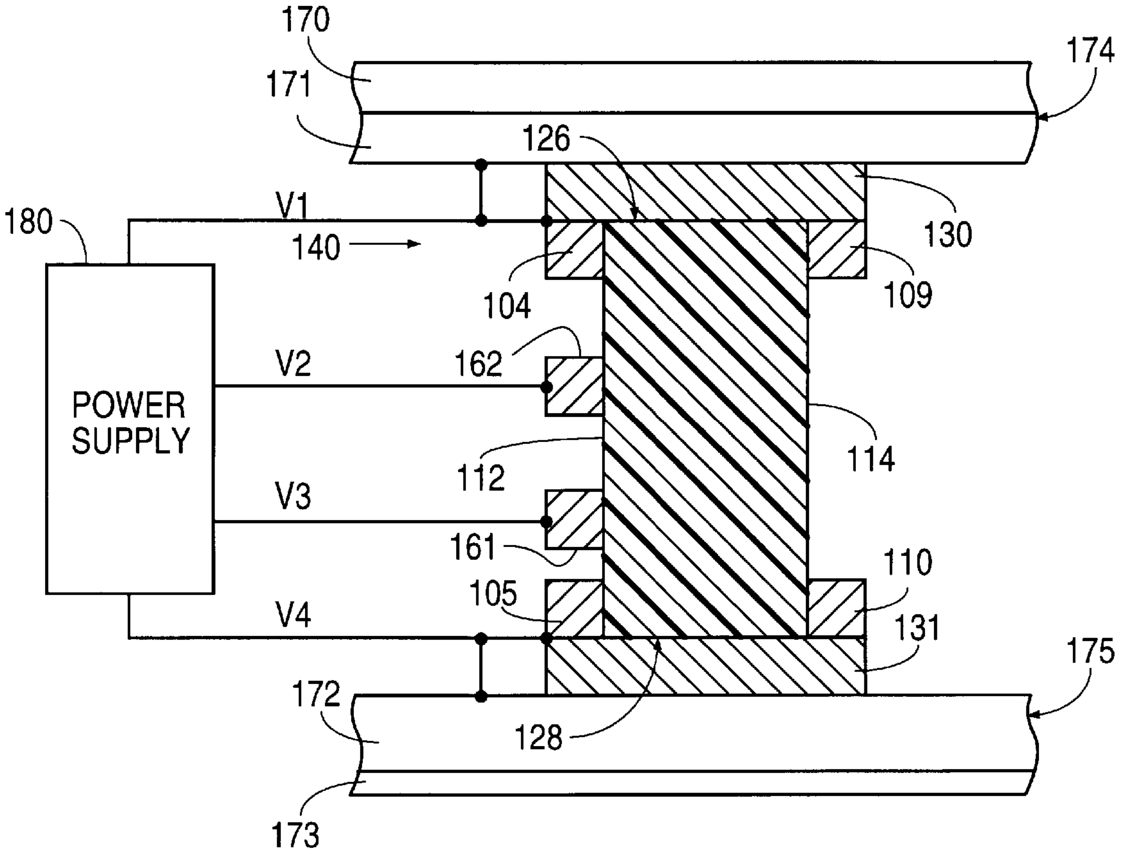

FIG. 4 depicts metal potential adjustment electrodes 161–162 formed on outside surface 112 of spacer 140. Potential adjustment electrodes 161–162 are typically formed at the same time that face metallization strips 101–110 are formed. Potential adjustment electrodes 161–162 are approximately 0.025 mm wide. In a particular embodiment, spacer 140 has a height of approximately 1.27 mm, potential adjustment electrode 161 is located approximately 0.25 mm from electron emitting structure 172, and potential adjustment electrode 162 is located 0.76 mm from electron emitting structure 172. Edge metallization strip 130 contacts light emitting structure 171 situated along faceplate 174. Edge metallization strip 131 contacts electron emitting structure 172 situated along backplate 175.

The voltages of light emitting structure 171, edge metallization strip 126, and face metallization strips 104 and 109 are controlled by a power supply circuit 180, which is connected to at least two of the electrodes formed on outside surface 112. Power supply circuit 180 is a conventional element which can take various forms. In FIG. 4, power supply circuit 180 is connected to face metallization electrodes 104 and 105, as well as potential correction electrodes 161 and 162. Power supply circuit 180 provides a first voltage V1 to face metallization electrode 104, a second voltage V2 to potential correction electrode 162, a third voltage V3 to potential correction electrode 161 and a fourth voltage V4 to face metallization electrode 105, wherein V1>V2>V3>V4. Spacer 140 is sufficiently thin that potential correction electrodes 161–162 control the voltage distribution at opposite surface 114. In alternative embodiments, potential correction electrodes are also included on surface 114.

In an alternative embodiment, power supply circuit 180 provides only a first voltage V1 to face metallization electrode 104 and a second voltage V4 to face metallization electrode 105. In such an embodiment, the voltages existing on potential correction electrodes 161–162 are determined by the voltage divider circuit created by potential correction electrodes 161–162 and spacer 140. That is, the voltages on potential correction electrodes 161–162 are determined by the resistance of the portion of spacer 140 located between electrodes 104 and 162, the resistance of the portion of spacer 140 located between electrodes 162 and 161, and the resistance of the portion of spacer 140 located between electrodes 161 and 105.

Potential adjustment electrodes 161–162 control the voltage distribution along spacer 140. Stray electrons which strike outside surfaces 112 and 114 of spacer 140 travel to potential adjustment electrodes 161–162, thereby preventing charge build-up at the outside surfaces 112 and 114 of spacer 140. Power supply circuit 180 is typically connected at the ends of spacer 140 which extend outside of the active regions of the faceplate and backplate structures 174 and 175.

Figure 5A:
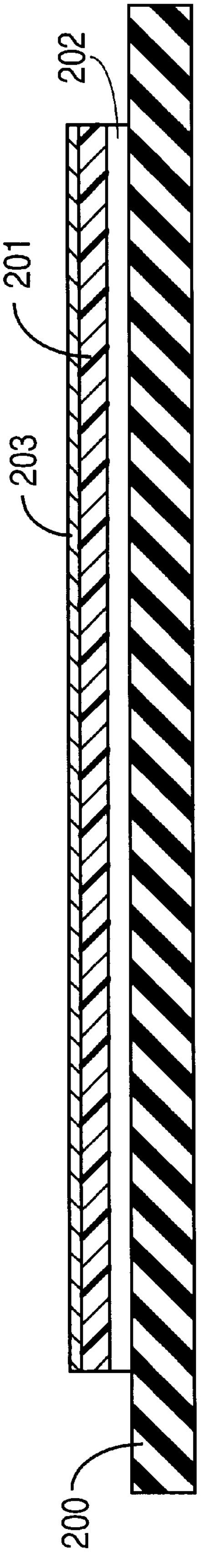

FIGS. 5*a*–5*d* illustrate a variation of Method (1). As illustrated in FIG. 5*a*, wafer 201 is attached to glass substrate 200 with an adhesive 202. In one embodiment, adhesive 202 is wax-based bonding material. Face metallization layer 203 is formed on wafer 201 by sputtering, evaporation or chemical deposition before wafer 201 is attached to glass substrate 200.

Figure 5B:
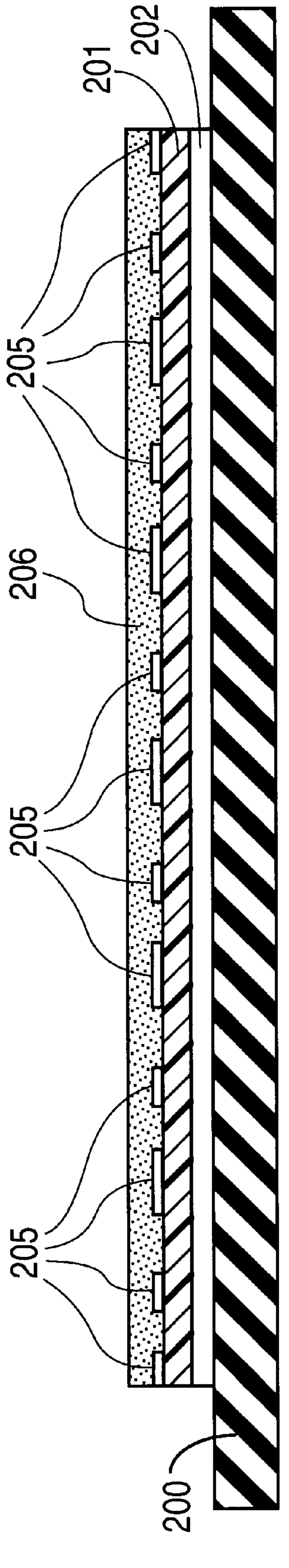

Face metallization layer 203 is patterned using conventional photolithographic methods to create face metal electrodes 205 (FIG. 5*b*). Face metal electrodes 205 are then coated with a protective film 206 (FIG. 5*b*). A layer of photoresist can be used to form protective film 206.

Figure 5C:
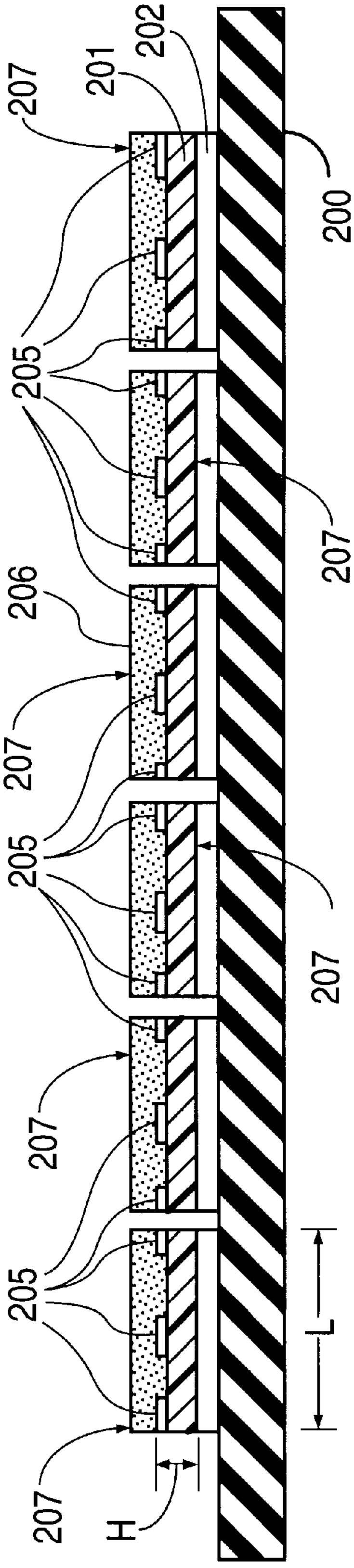

Wafer 201 is then sawed into strips 207 (FIG. 5*c*). In one embodiment, strips 207 have a length L of 1.27 mm and a height H of 0.064 mm.

Figure 5D:
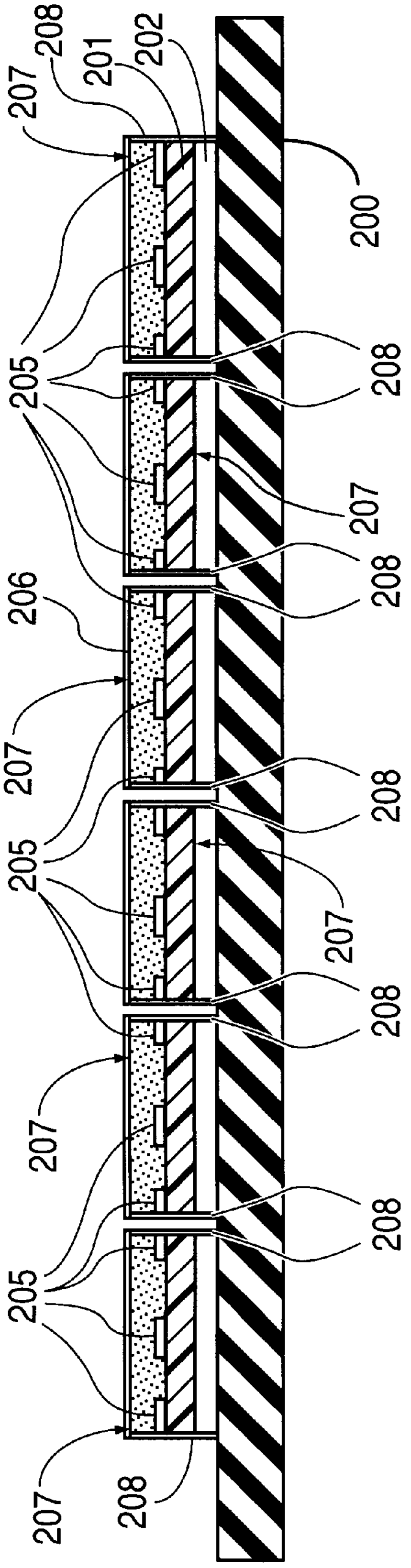

Metal is then formed on the exposed edges of strips 207 by sputtering, evaporation or chemical deposition to form edge metal electrodes 208 (FIG. 5*d*). Protective film 206 and adhesive 202 are dissolved, thereby separating strips 207 from glass substrate 200. Strips 207 are then cleaned (e.g., ultrasonically).

In another variation of Method (1), the green (unfired) ceramic is slit into strips. The organic elements of the unfired ceramic tape render the tape plastic and capable of being handled in similar fashion to conventional plastic sheet materials. Thus, the slitting can be accomplished by feeding the unfired ceramic sheet through a conventional slitter similar to equipment used in the fabrication of paper and plastic products. These strips are then fired in specially designed fixtures to form the spacers. The fired strips can be metallized in a similar fashion to the wafer described above.

In another variation of this method, the metallization may be a metal chosen to be compatible with the high firing temperature required to convert the green wafer to ceramic. This technique, known as cofiring, has been used to fabricate packages for mounting semiconductor integrated circuit devices. Metals used for cofiring include tungsten and molybdenum at high temperatures. Copper and silver can be cofired with low temperature glass ceramics. Wafers with stripes of metal applied in the green (unfired) state can be fabricated either into fired wafers which are subsequently cut into individual spacers, or cut into strips along the metallized stripes and fired as individual spacers.

FIG. 6 illustrates spacers 340 and 341 positioned between faceplate structure 350 and backplate structure 351 of a flat panel CRT display. Face metallization strips 330–333 adjoin faceplate structure 350, and face metallization strips 334–337 adjoin backplate structure 351. Faceplate structure 350 includes faceplate 302 and light emitting structure 306. Backplate structure 351 includes backplate 303 and electron emitting structure 305. Illustratively, the internal surfaces of faceplate 302 and backplate 303 are typically 0.1–2.5 mm apart. Faceplate 302 is glass having, illustratively, a thickness of 1.0 mm. Backplate 303 is glass, ceramic, or silicon having, illustratively, a thickness of 1.0 mm. The center-to-center spacing of spacers 340 and 341 is, illustratively, 8 to 25 mm along dimension 316.

Electron emitting structure 305 includes electron-emissive elements (field emitters) 309, a patterned metallic emitter electrode (sometimes referred to as a base electrode) divided into a group of substantially identical straight emitter electrode lines 310, a metallic gate electrode divided into a group of substantially identical straight gate electrode lines 311, an electrically insulating layer 312 and focusing ridges 380. Other types of electron emitting structures can be used with the spacers of the invention.

Emitter electrode lines 310 are situated on the interior surface of backplate 303 and extend parallel to one another at a uniform spacing. Insulating layer 312 lies on emitter electrode lines 310 and on laterally adjoining portions of backplate 303. Gate electrode lines 311 are situated on insulating layer 312 and extend parallel to one another (and perpendicular to emitter electrode lines 310) at a uniform spacing.

Field emitters 309 are distributed in an array above the interior surface of backplate 303. In particular, each group of field emitters 309 is located above the interior surface of backplate 303 in part or all of the projected area where one of gate lines 311 crosses one of emitter lines 310. Spacers 340 and 341 extend towards areas between field emitters 309 and also between emitter electrode lines 310.

Each group of field emitters 309 extends through an aperture (not shown) in insulating layer 312 to contact an underlying one of emitter electrode lines 310. The tops (or upper ends) of each group of field emitters 309 are exposed through a corresponding opening (not shown) in an overlying one of gate electrode lines 311. Field emitters 309 can have various shapes such as needle-like filaments or cones.

Focusing ridges 380, which extend above gate lines 311, are electrically isolated from gate lines 311. Focusing ridges 380 are described in more detail in U.S. patent application Ser. No. 08/188,855, cited above. Spacers 340 and 341 (and face metallization strips 334–337) contact focusing ridges 380. In this case, face metallization strips 334–337 abut focusing ridges 380 and are held at the same potential as focusing ridges 380. An electrically conductive material (not shown) can also be located outside the active area of backplate structure 351 to provide an electrical connection between face metallization strips 334–337 and focusing ridges 380. This electrical connection prevents charge build-up near the ends of spacers 340 and 341 adjacent electron emitting structure 305. In alternative embodiments, spacers 340 and 341 include edge metallization strips (not shown).

Light emitting structure 306 is situated between faceplate 302 and spacers 340 and 341. Light emitting structure 306 consists of a group of light emissive regions 313 (e.g., phosphor) that produce light when struck by electrons, a black matrix of substantially identical dark, non-reflective ridges 314 that do not produce light when struck by electrons, and a light reflective layer 315. Light emissive regions 313 are divided into a plurality of substantially identical regions 313*r*, 313*g* and 313*b* that emit red (R), green (G) and blue (B) light, respectively.

Light reflective layer 315 and, consequently, light emissive regions 313 are maintained at a positive voltage of 1500–10,000 volts relative to the voltage of field emitters 309. When one group of field emitters 309 is suitably excited by appropriately adjusting the voltages of emitter electrode lines 310 and gate electrode lines 311, that group of field emitters 309 emits electrons which are accelerated towards a target light emissive region 313. FIG. 6 illustrates trajectories 317 followed by one such group of electrons. Upon reaching the target light emissive region 313, the emitted electrons cause these phosphors to emit light 318.

Some of the electrons invariably strike parts of the light-emitting structure other than the target phosphors. As illustrated by trajectory 317*a*, some electrons strike the spacers. The black matrix formed by dark ridges 314 compensates for off-target hits in the row direction to provide sharp contrast as well as high color purity.

Light reflective layer 315, typically aluminum, is situated on light emissive regions 313 and dark ridges 314 as shown in FIG. 6. The thickness of light reflective layer 315 is sufficiently small that nearly all of the emitted electrons that strike layer 315 pass through layer 315 with little energy loss. The surface portions of layer 315 adjoining light emissive regions 313 are quite smooth so that part of the light emitted by regions 313 is reflected by layer 315 through faceplate 302. Light reflective layer 315 also acts as the anode for the display. Because light emissive regions 313 contact layer 315, the anode voltage is impressed on regions 313.

Spacers 340 and 341 contact light reflective layer 315 on the anode side of the display. Because dark ridges 314 extend further toward backplate 303 than light emissive regions 313, spacers 340 and 341 contact portions of layer 315 along the tops (or bottoms in the orientation shown in FIG. 6) of ridges 314. The extra height of ridges 314 prevents spacers 340 and 341 from contacting and damaging light emissive regions 313. Face metallization strips

330–333 abut layer 315 and are therefore electrically connected to layer 315.

An electrically conductive material (not shown) can also be located outside the active area of faceplate structure 350—i.e., around the outer edges of faceplate structure 350—to provide an electrical connection between face metallization strips 330–333, and layer 315. For example, face metallization strips 330–333 and layer 315 can extend to the outer edges of faceplate structure 350 to be electrically connected to an electrically conductive frit. The frit is a glass composite material which bonds the outer edges of faceplate structure 350 to the flat panel display. The frit is made electrically conductive by including metal particles in the glass composite material.

The electrical connections between face metallization strips 330–333 and layer 315 cause face metallization strips 330–333 to be biased at the same high voltage as layer 315. As a result, stray electrons which strike the surface of spacers 340 and 341 near face metallization strips 330–333 travel to face metallization strips 330–333. In this manner, charge build-up is prevented near the ends of spacers 340 and 341 adjacent light emitting structure 306.

Electrically conductive frit material can also be used to connect potential adjustment electrodes or face metallization strips to a power supply. FIG. 7 illustrates the connection of potential adjustment electrodes 701 and 702 of spacer 700 to power supply circuit 703 in accordance with the invention. Potential adjustment electrodes 701 and 702 extend along spacer 700 outside of the active region of the flat panel display. Potential adjustment electrodes 701 and 702 then extend to one of the edge surfaces of spacer 700. Portions of electrically conductive frit material 715 and 716 connect electrodes 701 and 702 to electrodes 711 and 712 on substrate 721 of the backplate structure 720. Electrodes 701 and 702 connect to power supply circuit 703, thereby applying the desired voltages to potential adjustment electrodes 701 and 702. Frit portions 715 and 716 also help to support spacer 700.

Alternatively, one or both of electrodes 701 and 702 extend to the other edge surface of spacer 700 and are connected with frit material to corresponding electrodes on a faceplate structure (not shown). In other variations, face metallization strips (not shown) on spacer 700 are connected to electrodes formed on the faceplate or backplate structure in the manner previously described.

Turning now to Method (2), spacers are fabricated by laminating electrically resistive skins (or wafers) onto outside surfaces of an electrically insulating core (or wafers). FIG. 8 depicts a laminated wafer 400 formed with an insulating ceramic core 401 and electrically resistive skins 402 and 403. In one embodiment, insulating core 401 is formed from an alumina ceramic tape having a thickness of 7.5–75 $\mu$m. The alumina core ceramic is prepared by first dispersing alumina powder in an organic material such that a homogenous distribution of the alumina powder in the organic material is achieved. The dispersion can be carried out in a ball mill, vibratory mill, planetary mill or other apparatus known to those skilled in the art. The dispersed powder organic mix is formed into tape by a process such as tape casting or roll compaction. In tape casting, the organic slurry is carried under a doctor blade to level a thin film to a uniform height. By careful control of the solvents and other organic constituents, this film of slurry can be made to dry to a uniform film of a precise thickness. Another method of preparing tape is to form the dispersed powder slurried in the organic mix into a tape by passing slurry through a pair of rollers. These rollers squeeze the tape to a uniform thickness. This is commonly called roll compaction. Feedstocks for roll compaction may also be formed by spraying the ceramic powder dispersed in a binder and solvent mix into a special drying chamber. This process forms large particles of the powder and binders. By choice of proper ratios for the particular particle morphology of the powder this "spray dried" powder can be made free flowing. This free flowing powder forms a convenient feedstock for the roll compaction process.

The 90/10 alumina-titania composition and the 2/34/64 composition discussed in connection with Method (1) are suitable for use as electrically resistive skins 402 and 403 in Method (2). There are a large number of other compositions suitable for use as electrically resistive skins 402–403. Any of the compositions previously described in connection with Method (1) may be used. Compositions that cannot be used to fabricate uniform electrically resistive spacers by reason of strength or uniformity can be used to fabricate electrically resistive skins 402–403. As a result, the composition range is wider for resistive skins 402–403. The objective is to formulate a material with an electrical resistivity in the proper range and a low and controllable secondary electron emission.

Solid solutions of chromium and aluminum oxides are particularly useful. These compositions require firing in carefully controlled atmospheres. The conduction mechanism of such solid solutions is complex. Since the chromia and alumina form a solid solution, the separation between chromium cations is too great for easy transfer of the electrons between them. The charge carriers are therefore supplied by a small admixture of titanium dioxide. Titanium dioxide (titania) also aids the sintering of chromium sesquioxide by stabilizing the oxidation states. Subjecting titania to the reducing atmosphere needed to fire the chromia-alumina solid solution reduces the titania to a lower oxide state. This not only aids in the sintering of the body, but also provides the needed conductivity by partially reducing the oxidation state of the titania.

The solubility of the titania in the crystals of chromia-alumina solid solution is limited to approximately 2%. As a result, at concentrations greater than 2%, the majority of the titania is exuded to the grain boundaries of the material as the crystals grow during the sintering operation. Thus, the concentration of the titania is quite high in the more disordered material at the grain boundaries. The volume fraction of the material occupied by this less ordered material is small compared to that of the grains of crystalline solid solution. However, since the material is rich in titania, the transfer of electrons between titanium cations of varying coordination is easy compared to that in the crystalline material that forms the bulk of the solid. Therefore the charge transport is mostly through the grain boundary materials in these compositions.

The secondary electron generating properties of the titania-chromia-alumina solid solutions are quite close to those of the pure chromium oxide which produces a desirable low charging current in spacers made of these materials, while the conductivity on the grain boundaries may be manipulated over a wide range by varying the admixture of titania.

The sintering behavior of the titania-chromium-alumina materials is complex. To make a suitable spacer the proper ratio of grain volume to grain boundary volume must be maintained while controlling not only the composition of the solid solution, but also the composition of the grain boundary. The firing conditions, particularly the peak temperature, the partial pressure of oxygen in the kiln atmosphere, the firing ramps, and the firing times must be appropriate to the particular composition being processed. Composition ranging from 10% chromium sesquioxide and 90% alumina to 90% chromium and 10% alumina have been made. These compositions have all been modified with 0.25% to 8% titanium dioxide. The kiln atmospheres have ranged from $10^{-20}$ atm oxygen partial pressure as water vapor in a hydrogen atmosphere to 3% oxygen as water vapor in a mixture of 20% hydrogen 80% nitrogen.

In one embodiment, the 2/34/64 composition is cast into a tape having a thickness of approximately 0.05 mm.

The alumina tape is cut into wafers to form insulating cores, such as insulating core 401. Similarly, the 2/34/64 composition tape is cut into wafers to form electrically resistive skins, such as skins 402 and 403. Insulating core 401 and resistive skins 402 and 403 have approximately the same length and width measurements. For example, insulating core 401 and resistive skins 402–403 can each be approximately 10 cm wide and 15 cm long.

The spacer is formed of a laminate of resistive skins 402 and 403 on either side of insulating ceramic core 401. The layer thicknesses are chosen so that the completed laminate will have the desired spacer thickness. In one embodiment, spacers are made by laminating 0.0127 mm thick resistive skins to a 0.3175 mm thick ceramic core. The layers can be laminated by continuously feeding strips of the three unfired layers 401–403 through metal rollers adjusted to provide sufficient heat and pressure to fuse the green material. This provides a continuous and low cost method for fabricating the laminate. At a temperature of approximately 100° C., the unfired layers 401–403 easily fuse when passing through the rollers. As a result, laminated wafer 400 is formed.

The remaining process steps of Method (2)—e.g., forming face and/or edge metallization strips—are similar to the steps previously described in connection with Method (1). However, in Method (2), the step of firing wafer 400 in a reducing atmosphere is performed such that laminated wafer 400 experiences a greater degree of reduction. This advantageously reduces the electrical resistivity of resistive skins 402 and 403 without significantly decreasing the bulk resistivity of the spacer. The desired electrical resistivity of resistive skins 402 and 403 is $10^5$–$10^{10}$ ohm-cm.

FIG. 9 illustrates a spacer 404 formed by Method (2). Spacer 404 includes portions of insulating core 401 and electrically resistive skins 402 and 403. Spacer 404 includes face metallization strips 405 and 406 on outside surface 407 of resistive skin 402, and face metallization strips 408 and 409 on outside surface 410 of resistive skin 403. Spacer 404 also includes edge metallization strip 412 formed on edge surface 414 and edge metallization strip 416 formed on edge surface 418. Spacer 404 can also be fabricated with only face metallization strips 405–406 and 408–409 or only edge metallization strips 412 and 416.

The total thickness of the laminated spacer formed by Method (2) is approximately the same as the thickness of the solid spacer formed by Method (1). Resistive skins 402 and 403 can be cast at a minimum thickness of 70–80 $\mu$m.

Laminated spacer 404 formed by Method (2) advantageously exhibits a high bulk resistivity because of the insulating characteristics of core 401. The strength of laminated spacer 404 is approximately equal to the strength of the material used to fabricate insulating core 401 (e.g., alumina). Furthermore, the steps set forth in connection with Method (2) make it relatively easy to control the sheet resistance of skins 402 and 403.

Additionally, because skins 402 and 403 are thin and separated by insulating core 401, defects such as pinholes are not as important as they are for spacers of solid construction. A small pin hole does not adversely affect the operation of spacer 404 for two reasons. One reason is that a hole which is smaller in diameter than the thickness of skins 402 and 403 still effectively shields insulating core 401 from the electrons which are transmitted between the faceplate and backplate structures. The other reason is that the strength and other performance factors of spacer 404 are largely unaffected by small defects in skins 402 and 403 since such defects terminate at core 401 and therefore can not propagate through core 401 to cause failure of spacer 404.

In variations of Method (2), laminated wafers such as laminated wafer 400 are fabricated with skins made of other ceramic compositions which include ceramics containing transition metal oxides. There are many compositions which are suitable for such spacers. In addition to the transition metal oxide compositions previously described, there are compositions containing copper (e.g., copper oxide), families of chalcoginides, and semiconductors with resistivities in the proper range.

Turning now to Method (3), the electrically insulating ceramic core of the spacer can be formed from a ceramic composition, such as alumina containing a transition metal oxide, wherein the transition metal oxide is present in the higher oxide states. Electrically resistive skins are formed at the outside surfaces of the spacer by chemically reducing the outside surfaces of the spacer. By reducing the outside surfaces of the spacer, the coordination of the transition metal ions at these outside surfaces is altered, thereby causing the transition metal oxide to become electrically resistive at the outside surfaces of the spacer. The spacer core remains electrically insulating. The reducing step can be performed in a number of different ways, including firing the spacer in a reducing atmosphere, or exposing the spacer to a laser beam, charged particles or photon irradiation.

Spacers fabricated in accordance with Method (3) are formed from a ceramic composition which is formulated such that the electrical resistivity of the composition can be altered by selective reduction. The ceramic composition is selected such that the resistivity of the composition is a function of the oxidation state of at least one component of the composition. The ceramic composition is also selected such that the crystal structure of the composition allows the electrical resistivity of the composition to be altered by selective reduction of the surface of the composition. Compositions which exhibit these properties include glasses containing transition metal oxides, non-centrosymmetric titanates such as barium titanate, lead titanate and bismuth titanate. Mixtures of these compositions can also be used. Commercial materials, such as iron and chromium containing glasses (typically used as glazes for high voltage insulator strings), can also be used.

In each of the above listed compositions, the resistivity is determined by the ratio of the transition metal cations in one coordination to the transition metal cations in another coordination. For example, in a composition in which titanium cations are the charge carriers, the ratio of $Ti^{3+}$ to $Ti^{4+}$ cations determines the resistivity of the composition. Similarly, in a composition in which vanadium cations are the charge carriers, the ratio of $V^{4+}$ to $V^{5+}$ cations determines the resistivity. The superscripted numbers indicate the number of nearest neighbor oxygen anions. By altering these ratios, the resistivity of the compositions are changed. By controlling the oxide states of these compositions, a spacer can be fabricated having a core with a resistivity which is much higher than the resistivity of the outer surfaces of the spacer.

It is important that the transition metal cation be bound in the composition such that the oxidation state of the cation can be altered by a displacive (rather than reconstructive) transformation of the crystal lattice of the composition. The displacive transformation is effected at temperatures well below the melting point of the material, but substantially above the temperature the spacer will experience during normal use in a flat panel display. Consequently, the electrical properties of the composition remain stable during use.

One method of formulating a suitable ceramic composition is to dissolve a transition metal in a silicate glass. The transition metal cations provide the charge carriers to provide electrical conductivity. The number of charge carriers present in the material depends on the ratio of the cations in the two relevant coordinations (e.g., $Ti^{3+}$ and $Ti^{4+}$ in the case of titanium). The number of cations in each coordination is a function of the total oxidation state of the composition. If this oxidation state is altered, the conductivity is also altered. A glass or glass ceramic containing transition metal ions may be altered by oxidation or reduction at low temperatures if the crystal structure permits displacive transformation of the cation coordination. Thus, a transition metal oxide glass can serve as the spacer, or the glass may be filled with other ceramic components to produce a material with a TCE and secondary electron emission tailored to particular values.

If the transition metal oxide is dispersed in a very stable crystal, it is very difficult to alter the coordination of the cations. To substantially reduce the electrical resistivity of such a crystal, high temperature reconstructive transformations must be induced. A chromia-alumina solid solution provides an example of a stable crystal which must undergo reconstructive transformation to reduce the resistivity of the solid solution.

After selecting a ceramic composition which allows alteration of the oxide state via a displacive transformation, the spacer is formed and fired in a manner similar to that previously described in connection with Method (1). The firing atmosphere is dictated by the selection of the oxide system which provides the conduction. For example, if titanium or iron is selected as the active cation, then an initial firing step is carried out in air. This air firing would place most of the titanium or iron cations in higher coordination sites (e.g., $Ti^{4+}$). Thus, the ratio of cations in the lower coordination sites (e.g., $Ti^{3+}$) to those in the higher coordination sites (e.g., $Ti^{4+}$) is low. Consequently, the resulting composition is electrically insulating.

A resistive layer is formed on the outer surface of the composition by a second firing in a reducing atmosphere. This second firing creates vacancies in the anion lattice surrounding some of the titanium or iron cations. As a result, the ratio of $Ti^{3+}$ to $Ti^{4+}$ cations (assuming titania is used) is raised and the composition becomes more conductive at the outer surface. The depth of these electrically resistive skins can be controlled by choosing a proper combination of firing time and temperature. For example, resistive skins have been formed on air fired lead barium titanate compositions by exposure to 10% hydrogen, 90% nitrogen atmospheres for eight hours at 950° C. After the resistive skin has been formed on a wafer, the wafer can then be metallized and cut to form the spacers.

The thickness and resistivity of the resistive skins can be selected to reduce the power dissipated in the spacer, or allow the use of a material with a lower surface resistivity without incurring a penalty in the power consumed. The electrically resistive skins are typically processed to produce a resistivity in the range of $10^6$ to $10^9$ ohm-cm.

FIG. 10 is a perspective view of a wafer 500 formed in accordance with Method (3). In one embodiment, wafer 500 has a thickness of approximately 100 μm.

FIG. 11 depicts a spacer 510 formed from wafer 500. Electrically resistive skins 502 and 503 provide a gradual transition from a relatively low surface resistivity at outside surfaces 504 and 505 to a relatively high bulk resistivity at core 501. Face metallization strips 516 and 517 are formed on outside surface 504, and face metallization strips 519 and 520 are formed on outside surface 505 of spacer 510. Edge metallization strips 524 and 525 are formed on edge surfaces 526 and 527, respectively. Metallization strips 516–517, 519–520 and 524–525 are formed in a manner similar to that previously described in connection with Method (1).

In a variation of Method (3), wafer 500 is slit into strips before the initial firing step. When the strips are fired in the reducing atmosphere, the transition metal oxide at all of the exterior surfaces (including outside surfaces 504 and 505 and edge surfaces 526 and 527) becomes electrically resistive.

In another variation of Method (3), $B_2O_3$ is included in the ceramic composition to lower the firing temperature and the resistivity without raising the secondary electron emission of the resulting spacer.

A spacer fabricated in accordance with Method (3) advantageously has a high bulk resistivity and a low secondary emission coefficient. Such a spacer therefore results in reduced power loss and reduced voltage variations proximate the spacer during operation of the flat panel display.

Turning now to Method (4), a wafer 600 is formed by placing an electrically resistive coating onto a solid electrically insulating core (or wafer), and firing the resulting structure. FIG. 12 depicts a wafer 600 formed in accordance with Method (4). Solid, electrically insulating core 601 can be fabricated by casting or compacting 100% alumina ceramic into a tape having a thickness of 100 μm. The tape is cut into wafers (or strips) and fired at a temperature between 1500 and 1700° C. for approximately two hours.

Electrically resistive coatings 602 and 603 are applied to core 601 while core 601 is in a large wafer format. Core 601 and resistive coatings 602–602 are fired and then cut into strips to make spacers.

Electrically resistive coatings 602 and 603 are applied to core 601 using any method which can be used to apply paint or dye to a surface. These methods include screen printing, spraying, roll coating, doctor blading or applying a decal. Some of these methods are described below.

In screen printing, the resistive material is applied as a paste or ink which is formed by placing the resistive material in an organic suspension. The suspension is forced through a mesh (usually stainless steel) in a manner very similar to that used to make decorative patterns on T-shirts or to print posters. The paste is placed on top of the screen and a squeegee blade rubs a thin coat of paste through the screen onto the underlying core 601. By proper choice of the consistency of the paste, the opening and thickness of the mesh and the speed and softness of the squeegee, a precisely controlled layer of the paste is transferred to core 601.

Alternatively the resistive material may be dispersed as a thinner liquid and sprayed onto the surface of core 601. This process is similar to paint spraying.

In roll coating, a thin layer of the resistive material in an organic suspension is squeezed onto the surface of core 601 by passing the substrate under specially grooved rubber rollers. By choosing the configuration of the grooves and compounding the organic suspension to suit this configuration, thin resistive coatings 602 and 603 placed on core 601 at very high speeds.

Precise coating thicknesses can also be applied by doctor blading. In doctor blading, a pool of the resistive material in an organic suspension is trapped behind a blade positioned above core 601. By moving core 601 relative to the blade and the pool at a constant speed, a constant and controlled thickness of the material is dragged under the blade and onto the surface.

The resistive material can also be dispersed in an organic material to form a tape using a method similar to the tape preparation methods previously described. This tape is cut to match the size of core 601, and pressed onto core 601. The plastic component of core 601 is chosen to provide adhesion or a separate adhesive layer may be applied.

Acceptable resistive materials include, but are not limited to, the various electrically resistive ceramic compositions previously described. Core 601 and electrically resistive coatings 602 and 603 are fired in accordance with the parameters previously set forth in connection with Method (1). The fired wafer 600 is processed in the same manner as previously described in connection with Method (1).

FIG. 13 shows a spacer 610 formed from wafer 600. Spacer 610 includes electrically insulating core 601 and electrically resistive coatings 602 and 603. Face metallization strips 615 and 616 are formed on outside surface 617 of spacer 610, and face metallization strips 619 and 620 are formed on outside surface 621 of spacer 610. Edge metallization strips 624 and 625 are formed on edge surfaces 626 and 627 of spacer 610.

In a variation of Method (4), the resistive coatings 602 and 603 are applied to insulating core 601 before the insulating core 601 is fired. Again, acceptable resistive coatings include, but are not limited to, the previously described combinations of alumina and transition metal oxides. The electrically resistive coatings are typically applied by screen printing, spray painting, roll coating, doctor blading or applying a decal. This variation of Method (4) may require an additional reduction step if the diffusion of the resistive coatings 602–603 into core 601 produces layers which are lower in conductivity than desired. In general, the greater the extent of the diffusion, the lower the conductivity of coatings 602–603. If the lattice chosen allows non-reconstructive reformation of the crystal (e.g., filling of oxygen vacancies), the reduction step provides a thin conductive layer on the surface of coatings 602–603 in a manner similar to that previously described in connection with Method (3).

The remaining steps of this variation of Method (4) are similar to the steps previously described in connection with Method (1).

In another variation of Method (4), resistive coatings 602 and 603 are formed from conductive glazes developed for suppressing electrical breakdown in high voltage insulators. These glazes exhibit the desired electrical resistivity and can be processed at reasonably low temperatures. Transition metals, such as iron, chromium, or titanium, can also be dissolved in these glazes to form acceptable resistive coatings. There are a number of commercial compositions used for this purpose. Most contain dissolved iron, titanium and/or chromium in the form of oxides.

Although Methods (1) through (4) are described in connection with alumina ceramic cores, it is possible to use other ceramic compositions, such as mullites, cordiorites, barium borosilicates, iron silicates, filled glasses, and zero shrink tolerance (ZST) materials. ZST materials obtain their unique properties by balancing the behavior of glass and ceramic filler components. A transition metal oxide can be admixed into the glass component without drastically altering the properties of the ZST material. Because the glass forms a continuous matrix throughout the structure of the ZST material, making the glass phase a controlled conductor is sufficient to control the electrical resistivity of the spacer.

Although certain of the previously described spacers have been described as having both face and edge metallization strips, these spacers may alternatively include only edge metallization strips or only face metallization strips. Moreover, each of these spacers may also include potential adjustment electrodes as described in connection with Method (1).

Various embodiments of the invention have been described. The descriptions are intended to be illustrative, not limiting. For example, the length of the spacers can be varied such that the spacers resemble "posts" or "walls." Thus, it will be apparent to one skilled in the art that modifications may be made to the invention as described without departing from the scope of the claims set out below.

We claim:

1. A method comprising the steps of:

applying an electrically resistive coating over a core wafer formed from electrically insulating ceramic to form a composite waver, the resistive coating comprising electrically insulating ceramic containing transition metal oxide; and cutting the composite wafer to form spacers.

2. The method of claim 1, further comprising the step of firing the composite wafer until a desired electrical resistivity is exhibited.

3. The method of claim 2, wherein the firing step comprises firing the composite wafer in a reducing atmosphere.

4. The method of claim 1, further comprising the step of forming face metallization strips over at least one of opposing outside face surfaces of the composite wafer.

5. The method of claim 4, wherein the cutting step entails cutting the composite wafer along the face metallization strips.

6. The method of claim 4, further comprising the step of firing the composite wafer until a desired electrical resistivity is exhibited.

7. The method of claim 1, further comprising the step of forming edge metallization strips over edge surfaces of the spacers.

8. The method of claim 1, further comprising the step of forming potential adjustment electrodes over at least one of opposing outside face surfaces of the composite wafer.

9. The method of claim 1, wherein the applying step comprises applying the resistive coating to opposing outside face surfaces of the core wafer.

10. A method comprising the steps of:

forming a composite wafer by covering a core wafer of electrically insulating ceramic with a resistive coating created at least from electrically insulating ceramic, transition metal, and oxygen, at least part of which is bonded to the transition metal and/or constituents of the ceramic in the resistive coating; and cutting the composite wafer to form spacers.

11. The method of claim 10, wherein the forming step entails combining the ceramic in the resistive coating with the transition metal in the form of transition metal oxide that contains the transition metal.

12. The method of claim 10, further comprising the step of firing the composite wafer.

13. The method of claim 12, wherein the firing step comprises firing the composite wafer until a desired electrical resistivity is exhibited.

14. The method of claim 13, wherein the firing step comprises firing the composite wafer in a reducing atmosphere.

15. The method of claim 12, wherein the firing step comprises firing the composite wafer in a reducing atmosphere.

16. The method of claim 10, further comprising the step of providing face metallization strips over at least one of opposing outside face surfaces of the composite wafer.

17. The method of claim 16, wherein the cutting step entails cutting the composite wafer along the face metallization strips.

18. The method of claim 16, further comprising the step of firing the composite wafer.

19. The method of claim 18, wherein the firing step entails simultaneously firing the composite wafer and the face metallization strips.

20. The method of claim 19, wherein the firing step comprises firing the composite wafer in a reducing atmosphere.

21. The method of claim 18, wherein the firing step comprises firing the composite wafer in a reducing atmosphere.

22. The method of claim 16, wherein the providing step entails providing the face metallization strips over both of the composite wafer's outside face surfaces.

23. The method of claim 16, further comprising the step of providing potential adjustment electrodes over at least one of the composite wafer's outside face surfaces.

24. The method of claim 23, wherein the two providing steps are performed simultaneously such that each potential adjustment electrode is situated between a pair of the face metallization strips.

25. The method of claim 16, further comprising the step of forming edge metallization over one edge surface of each spacer.

26. The method of claim 16, further comprising the step of forming edge metallization over opposing edge surfaces of each spacer.

27. The method of claim 10, wherein the forming step comprises applying the resistive coating to opposing outside face surfaces of the core wafer.

28. The method of claim 10, further comprising the step of installing at least one of the spacers between a backplate structure and a faceplate structure of a flat panel display.

29. The method of claim 28, wherein the backplate structure and the faceplate structure respectively comprise an electron emitting structure and a light emitting structure between which each so-installed spacer largely extends.

30. The method of claim 29, wherein each so-installed spacer contacts at least one of the electron emitting and light emitting structures through edge metallization formed over at least one edge surface of that spacer.

31. A method comprising the steps of:

forming a core wafer from electrically insulating ceramic;

applying an electrically resistive coating over the core wafer to form a composite wafer, the resistive coating comprising electrically insulating ceramic containing transition metal oxide;

firing the composite wafer;

forming face metallization strips over outside surfaces of the resistive coating; and cutting the composite wafer along the face metallization strips to form spacers.

32. The method of claim 31, further comprising the step of firing the core wafer prior to applying the resistive coating.

33. The method of claim 31, wherein the applying step comprises screen printing, spraying, roll coating or doctor blading the resistive coating over the core wafer, or applying a decal containing the resistive coating to the core wafer.

34. The method of claim 31, wherein the insulating ceramic is alumina.

35. The method of claim 31, wherein the resistive coating comprises alumina containing chromia, titania, iron oxide or vanadium oxide.

36. The method of claim 31, wherein the step of forming the face metallization strips comprises evaporating metal onto the resistive coating.

37. The method of claim 36, wherein the metal comprises aluminum, chromium or nickel.

38. The method of claim 31, further comprising the step of forming edge metallization strips over edge surfaces of the spacers.

39. The method of claim 31, wherein the step of forming face metallization strips further comprises forming potential adjustment electrodes over at least one of the outside surfaces of the resistive coating.

40. A method comprising the steps of:

performing a procedure in which (a) face metallization is provided over an outside face surface of a wafer created from electrically insulating ceramic, transition metal, and oxygen, at least part of which is bonded to the transition metal and/or constituents of the ceramic and (b) the wafer is attached to a substrate;

patterning the face metallization into multiple face metallization strips;

cutting the wafer to form spacers; and detaching the spacers from the substrate.

41. The method of claim 40, wherein the performing step entails combining the ceramic with the transition metal in the form of transition metal oxide that contains the transition metal.

42. The method of claim 40, further comprising the step of forming edge metallization over edge surfaces of the spacers.

43. The method of claim 42, wherein the edge metallization forming step is performed between the cutting and detaching steps.

44. The method of claim 40, further comprising the steps of:

forming, prior to the cutting step, a protective layer over the face metallization strips; and removing, subsequent to the cutting step, the protective layer.

45. The method of claim 44, further comprising, between the cutting and removing steps, the step of forming edge metallization over edge surfaces of the spacers.

46. A method comprising the steps of:

forming a wafer from a ceramic composition comprising electrically insulating ceramic and a transition metal oxide;

forming a face metallization layer over the wafer;

attaching the wafer to a substrate;

patterning the face metallization layer into a plurality of face metallization strips;

forming a protective layer over the face metallization strips and wafer;

cutting the wafer into spacer strips;

forming an edge metallization layer over the spacer strips;

removing the protective layer; and detaching the spacer strips from the substrate.

* * * * *